(12) United States Patent
Lehman et al.

(10) Patent No.: US 9,291,499 B2
(45) Date of Patent: Mar. 22, 2016

(54) RADIOMETER AND METHOD FOR USE OF SAME

(71) Applicant: NATIONAL INSTITUTE OF STANDARDS AND TECHNOLOGY, Gaithersburg, MD (US)

(72) Inventors: John H. Lehman, Boulder, CO (US); Nathan Tomlin, Boulder, CO (US)

(73) Assignee: NATIONAL INSTITUTE OF STANDARD AND TECHNOLOGY, Gaithersburg, MD (US)

( * ) Notice: Subject to any disclaimer, the term of this patent is extended or adjusted under 35 U.S.C. 154(b) by 169 days.

(21) Appl. No.: 14/297,153

(22) Filed: Jun. 5, 2014

(65) Prior Publication Data

US 2014/0332673 A1    Nov. 13, 2014

Related U.S. Application Data

(60) Provisional application No. 61/831,236, filed on Jun. 5, 2013.

(51) Int. Cl.

| | |
|---|---|
| *G01J 1/56* | (2006.01) |
| *G01J 5/20* | (2006.01) |
| *G01J 5/08* | (2006.01) |
| *B82Y 15/00* | (2011.01) |
| *G01J 5/00* | (2006.01) |

(52) U.S. Cl.
CPC ............... *G01J 1/56* (2013.01); *G01J 5/0853* (2013.01); *G01J 5/20* (2013.01); *B82Y 15/00* (2013.01); *G01J 2005/0077* (2013.01); *Y10S 977/742* (2013.01); *Y10S 977/954* (2013.01)

(58) Field of Classification Search
CPC .... B82Y 15/00; G01J 1/56; G01J 2005/0077; G01J 5/0853; G01J 5/20; Y10S 977/742; Y10S 977/954
See application file for complete search history.

(56) References Cited

U.S. PATENT DOCUMENTS

| 7,763,353 | B2 | 7/2010 | Geogegan | |
|---|---|---|---|---|
| 8,455,828 | B1* | 6/2013 | Egerton | G01J 1/46 250/339.01 |
| 8,495,946 | B2 | 7/2013 | Jackson | |
| 2012/0139078 | A1* | 6/2012 | Malm | G01J 5/02 257/467 |

OTHER PUBLICATIONS

N. A. Tomlin and J. H. Lehman, Carbon nanotube electrical-substitution cryogenic radiometer: initial results, Opl. Lett., 38, 175-7, (2013).
J. Lehman, N. Tomlin, S. Woods, M. White, Lithographic carbon nanotube bolometer for radiometry, NEWRAD conference abstract.
(Continued)

*Primary Examiner* — Francis M Legasse, Jr.
(74) *Attorney, Agent, or Firm* — Toby D. Hain

(57) ABSTRACT

A radiometer includes a substrate; a radiation absorber disposed on the substrate to absorb radiation; a thermal member disposed on the substrate to change electrical resistance in response to a change in temperature of the radiometer; and a thermal link to connect the radiometer to a thermal reference, wherein the radiation absorber, the thermal member, or a combination comprising at least one of the foregoing includes a plurality of carbon nanotubes, the carbon nanotubes being mutually aligned with respect to the substrate, and the radiometer being configured to detect optical power.

20 Claims, 26 Drawing Sheets

(56) References Cited

OTHER PUBLICATIONS

N. Tomlin, M. White, S. Woods, J. Lehman, Optimizing the carbon nanotube radiometer for operation at helium temperatures, NEWRAD conference abstract.

NASA ACT proposal, Greg Kopp, Carbon Absolute Electrical Substitution Radiometers (CAESR), submitted (Apr. 4, 2014).

N.A. Tomlin, A.E. Curtin, M. White, J.H. Lehman, Decrease in reflectance of vertically-aligned carbon nanotubes after oxygen plasma treatment, Carbon, in press, (2014).

Yang et al., Experimental observation of an extremely dark material made by a low-density nanotube array, Nano Letters, 8 (2), 446, (2008—Yang et al., Experimental observation of an extremely dark material made by a low-density nanotube array, Nano Letters, 8 (2), 446, (2008).

Mizuno et al., A black body absorber from vertically aligned single-walled carbon nanotubes, PNAS, 106 (15), 6044, (2009).

Khan et al., Variable range hopping in carbon nanotubes, Current Nanoscience, 6, 626, (2010).

Jiang et al., Planar MEMS supercapacitor using carbon nanotube forests, Proceedings of IEEE MEMS, 587, (2009).

* cited by examiner

20 μm

2 μm

100 μm

20 μm

US 9,291,499 B2

RADIOMETER AND METHOD FOR USE OF SAME

CROSS REFERENCE TO RELATED APPLICATIONS

This application claims the benefit of U.S. Provisional Patent Application Ser. No. 61/831,236 filed Jun. 5, 2013, the disclosure of which is incorporated herein by reference in its entirety.

STATEMENT REGARDING FEDERALLY SPONSORED RESEARCH

This invention was made with United States government support from the National Institute of Standards and Technology. The government has certain rights in the invention.

BACKGROUND

An electrical substitution radiometer (ESR) is a primary reference standard used worldwide to measure optical power. Typically, an ESR measures modulated optical power incident on a conical surface. Heater power is applied and monitored at constant radiometer temperature. An increase in the applied heater power when the incident light is blocked is a measure of the optical power absorbed by the radiometer. However, many ESRs can be bulky and are hand-assembled from individual components. Further, a time response of many ESRs are not optimal for detecting transient optical signatures. Moreover, some conical surface are not sensitive to low optical power or certain wavelengths.

Accordingly, advances in methods and equipment for radiometry would be advantageous and received favorably in the art.

BRIEF DESCRIPTION

The above and other deficiencies are overcome by, in an embodiment, a radiometer comprising: a substrate; a radiation absorber disposed on the substrate to absorb radiation; a thermal member disposed on the substrate to change electrical resistance in response to a change in temperature of the radiometer; and a thermal link to connect the radiometer to a thermal reference, wherein the radiation absorber, the thermal member, or a combination comprising at least one of the foregoing comprises a plurality of carbon nanotubes, the carbon nanotubes being mutually aligned with respect to the substrate, and the radiometer being configured to detect optical power.

Further disclosed is a radiometer comprising: a substrate; a radiation absorber disposed on the substrate to absorb radiation and comprising a first plurality of carbon nanotubes; a thermal member disposed on the substrate to change electrical resistance in response to a change in temperature of the radiometer; a thermal regulator disposed on the substrate to heat the radiometer and comprising a metal and a second plurality of carbon nanotubes; and a thermal link to connect the radiometer to a thermal reference, wherein the first plurality of carbon nanotubes and the second plurality of carbon nanotubes are mutually aligned with respect to the substrate, and the radiometer is configured to detect optical power.

Additionally disclosed is a process for acquiring optical power, the process comprising: providing a radiometer comprising: a substrate; a radiation absorber disposed on the substrate to absorb radiation; a thermal member disposed on the substrate to change electrical resistance in response to a change in temperature of the radiometer; a thermal regulator disposed on the substrate to heat the radiometer; and a thermal link to connect the radiometer to a thermal reference; absorbing optical radiation by the radiation absorber during an absorption time; and determining the optical power of the optical radiation, based on absorption of the optical radiation by the radiation absorber, wherein the radiation absorber, the thermal member, the thermal regulator, or a combination comprising at least one of the foregoing comprises a plurality of carbon nanotubes, the carbon nanotubes being mutually aligned with respect to the substrate, and the radiometer being configured to detect optical power.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been found that a radiometer herein having a radiation absorber, thermal member, or thermal regulator disposed on a substrate with a thermal link provides a simple, integrated, and reproducible optical power sensor that can be disseminated easily. The radiometer has a fast response time and operates over a wide range of wavelengths without a receiver cavity. The radiometer has an equivalent response to input electrical power or optical power. The radiometer sensitively measures optical power and can be traceable to the International System of Units (SI).

The radiation absorber is an efficient absorber of wavelengths in a broad continuous wavelength region and has uniform spectral responsivity. The radiometer also can include a sensitive thermal member at a low temperature, e.g., a cryogenic temperature. The radiometer can be formed using methods such as lithography so that a high-volume production of a plurality of radiometers can be made on a substrate, e.g., a silicon wafer, as well as controlling an arrangement of components of the radiometer. The radiometer is useful in an imaging array, a broadband (multispectral) sensor, or a multi-element trap radiometer.

In an embodiment, the radiometer is a thermal detector for optical radiation, including infrared radiation. In some embodiments, the radiometer includes a plurality of carbon nanotube disposed on a substrate that includes, e.g., silicon. The carbon nanotubes can be, e.g., a single walled or multi-wall carbon nanotube. In certain embodiment, the radiation absorber, thermal member, and thermal regulator include the plurality of carbon nanotubes. The radiometer can be electrically connected or optically connected to various devices. In an embodiment, the thermal member can be a calibrant for electrical calibration of the radiometer.

Advantageously, the radiometer can be made using semiconductor manufacturing processes. As such, the radiometer can be produced relatively inexpensively without complex or time-consuming hand assembly of electroformed or machined metal parts or discrete components. A size of the radiometer can be scaled, and a plurality of radiometers can be disposed in an apparatus for various applications such as an imaging array or multi-element sensor.

According to an embodiment, the radiometer presents a change in electrical resistance as a function of temperature change. The temperature change can be effected by, e.g., optical absorption or thermal heating. In an embodiment, the radiometer is electrically calibrated to provide an optical detector. Accordingly, the radiometer can be widely disseminated as an accurate optical power sensor. In some embodiments, the radiometer absorbs visible or infrared radiation. In another embodiment, the radiometer is a thermal imaging sensor.

Figure 1:
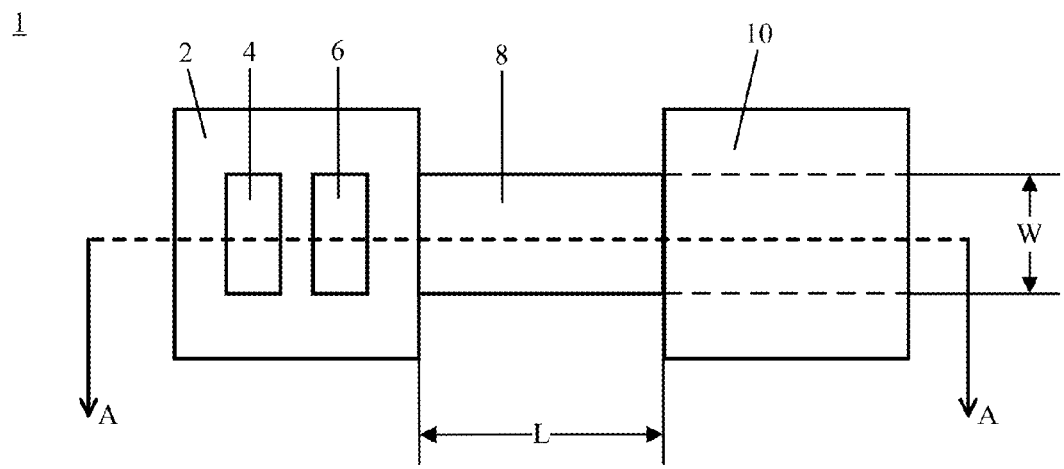
FIG. 1 shows a top view of a radiometer.
Figure 2:
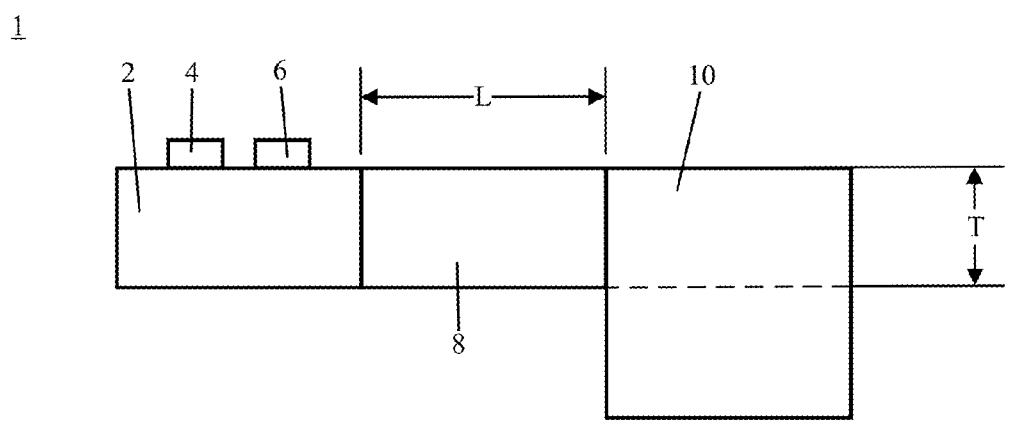
FIG. 2 shows a cross-section of the radiometer shown in FIG. 1.
Figure 3:
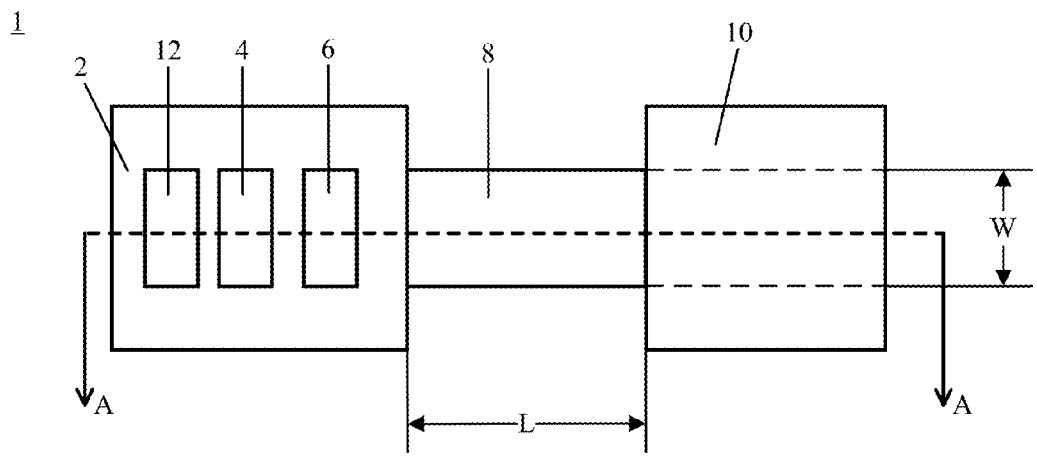
FIG. 3 shows a top view of a radiometer.
Figure 4:
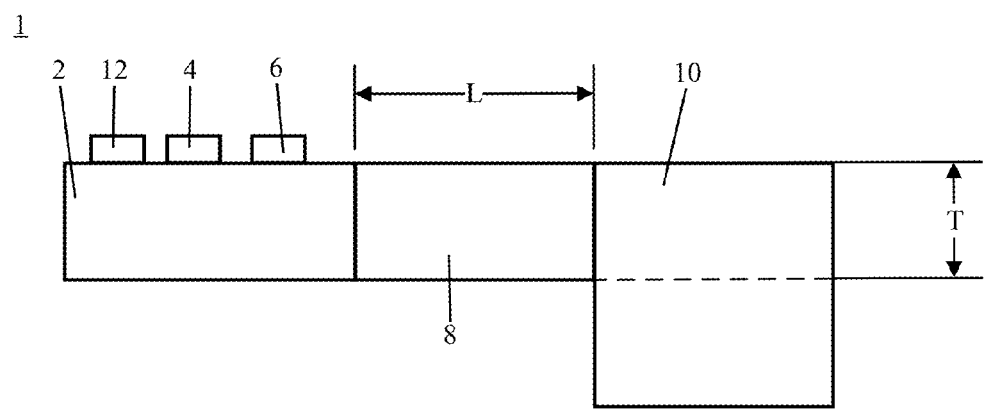
FIG. 4 shows a cross-section of the radiometer shown in FIG. 3.

In an embodiment, as shown in FIG. 1 (top view) and FIG. 2 (cross-sectional view along line A-A in FIG. 1), radiometer 1 includes radiation absorber 4 to absorb radiation and thermal member 6 disposed on a substrate 2. Thermal member 6 is configured to change electrical resistance in response to a change in temperature of the radiometer. A thermal link 8 connects the radiometer 1 to a thermal reference 10. The thermal link 8 can be an integral part of the radiometer 1 or a separate element connected to the radiometer 1 to thermally couple the radiometer 1 to the thermal reference 10. The thermal link 8 has a length L, width W, and thickness T. As shown in FIG. 3 (top view) and FIG. 4 (cross-section along line A-A in FIG. 3), in some embodiments, radiometer 1 also includes a thermal regulator 12 disposed on substrate 2.

Figure 5:
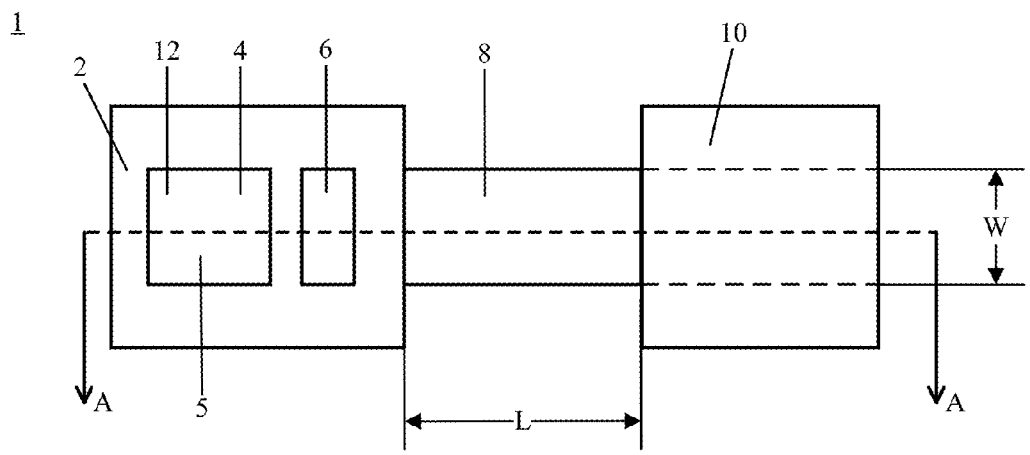
FIG. 5 shows a top view of a radiometer.
Figure 6:
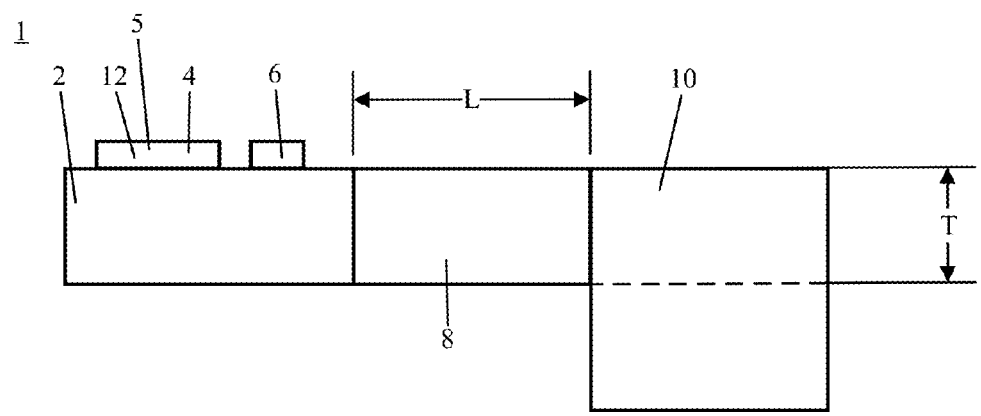
FIG. 6 shows a cross-section of the radiometer shown in FIG. 5.
Figure 7:
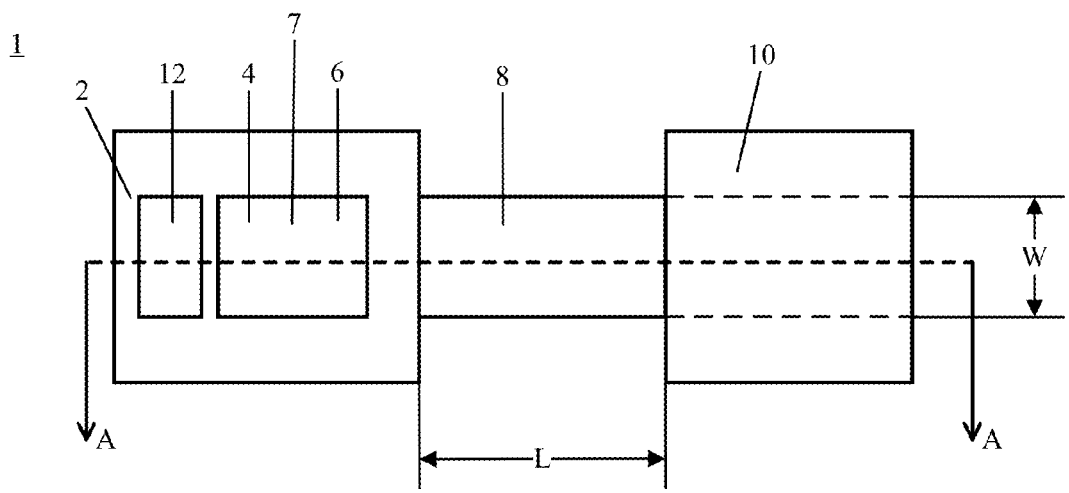
FIG. 7 shows a top view of a radiometer.
Figure 8:
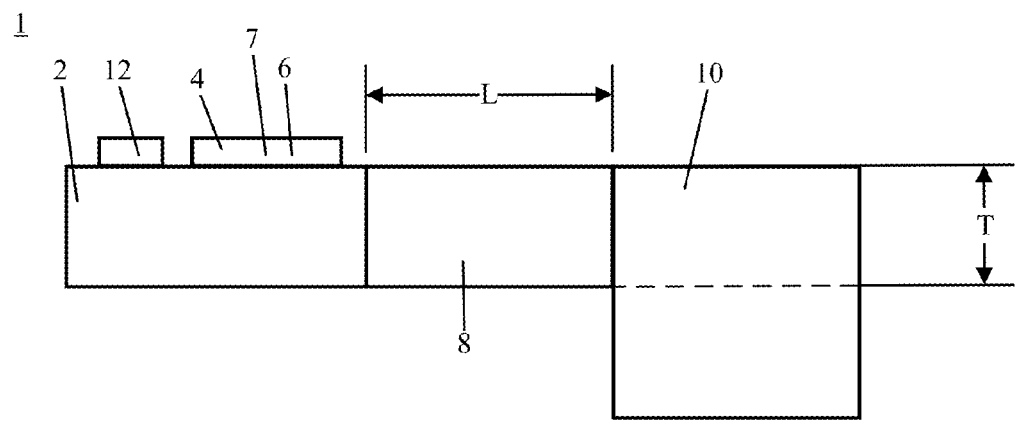
FIG. 8 shows a cross-section of the radiometer shown in FIG. 7.

An arrangement of radiation absorber 4, thermal member 6, or thermal regulator 12 can vary. In one embodiment, radiation absorber 4, thermal member 6, and thermal regulator 12 are separately disposed on substrate 2 as in FIG. 2. In another embodiment, as shown in FIG. 5 and FIG. 6, radiation absorber 4 and thermal regulator 12 are integrally disposed on substrate 2 as single member 5, and single member 5 and thermal member 6 are separately disposed on substrate 2. In some embodiments, as shown in FIG. 7 and FIG. 8, radiation absorber 4 and thermal member 6 are integrally disposed on substrate 2 as single member 7, and single member 7 and thermal regulator 12 are separately disposed on substrate 2.

Figure 9:
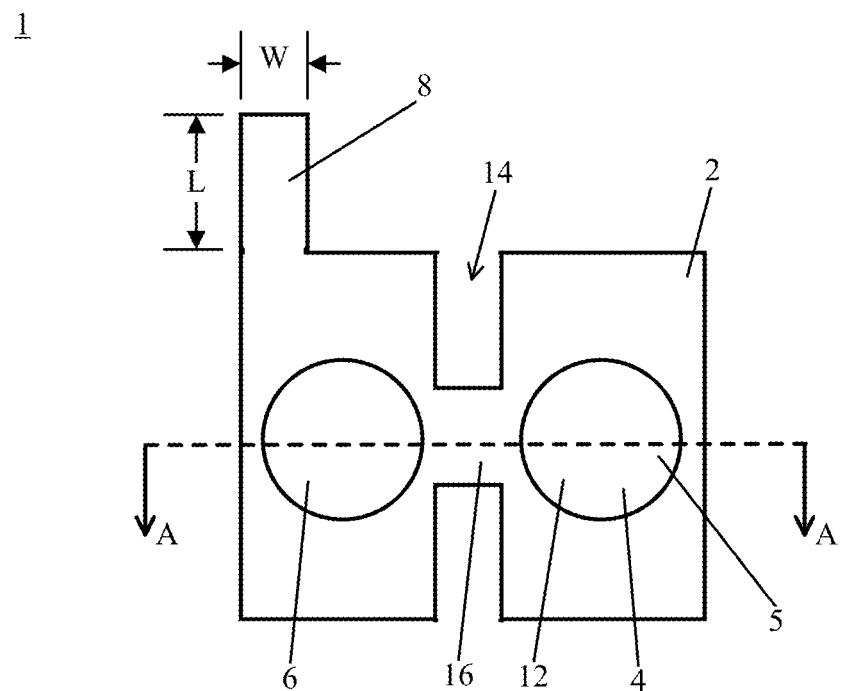
FIG. 9 shows a top view of a radiometer.
Figure 10:
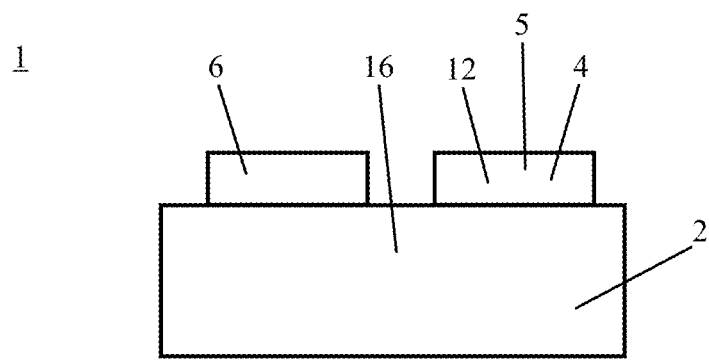
FIG. 10 shows a cross-section of the radiometer shown in FIG. 9.

With reference to FIG. 9 (top view) and FIG. 10 (cross-section along line A-A in FIG. 9), in a particular embodiment, radiometer 1 includes radiation absorber 4 and thermal regulator 12 disposed integrally disposed on substrate 2 as single member 5 and separated from thermal member 6 by thermal neck 16 formed by indent 14.

Figure 11:
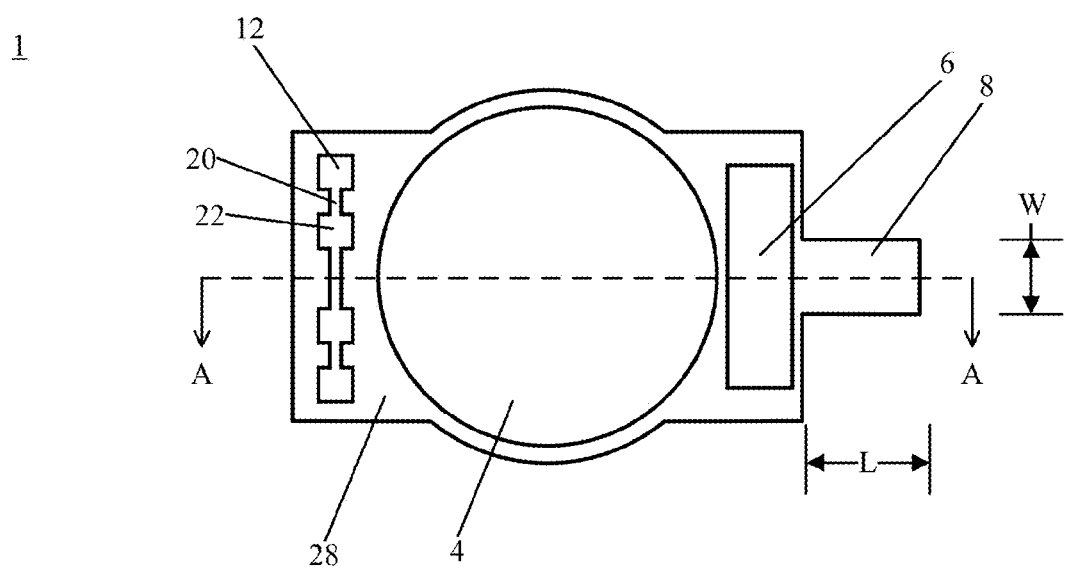
FIG. 11 shows a top view of a radiometer.
Figure 12:
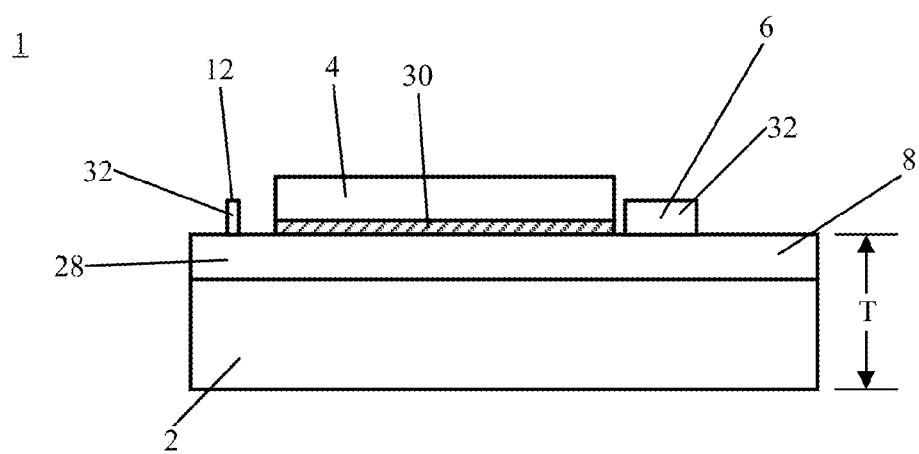
FIG. 12 shows a cross-section of the radiometer shown in FIG. 11.

In an embodiment, as shown in FIG. 11 (top view) and FIG. 12 (cross-section along line A-A in FIG. 11), radiometer 1 includes thermal member 12 having spine 20 and pad 22. It is contemplated that a shape and composition of radiometer 1 can be any shape or composition effective to absorb optical power, rapidly thermally distribute heat (thermal energy) generated by such absorption, and change temperature rapidly at a selected thermal conductance (generally determined by controlling a size of thermal link 8). With reference to FIG. 12, radiometer 1 further includes dielectric layer 28 disposed on substrate 2 and catalyst layer 30 interposed between dielectric layer 28 and radiation absorber 4. Here, thermal member 6 and thermal regulator 12 include metal layer 32.

Figure 13:
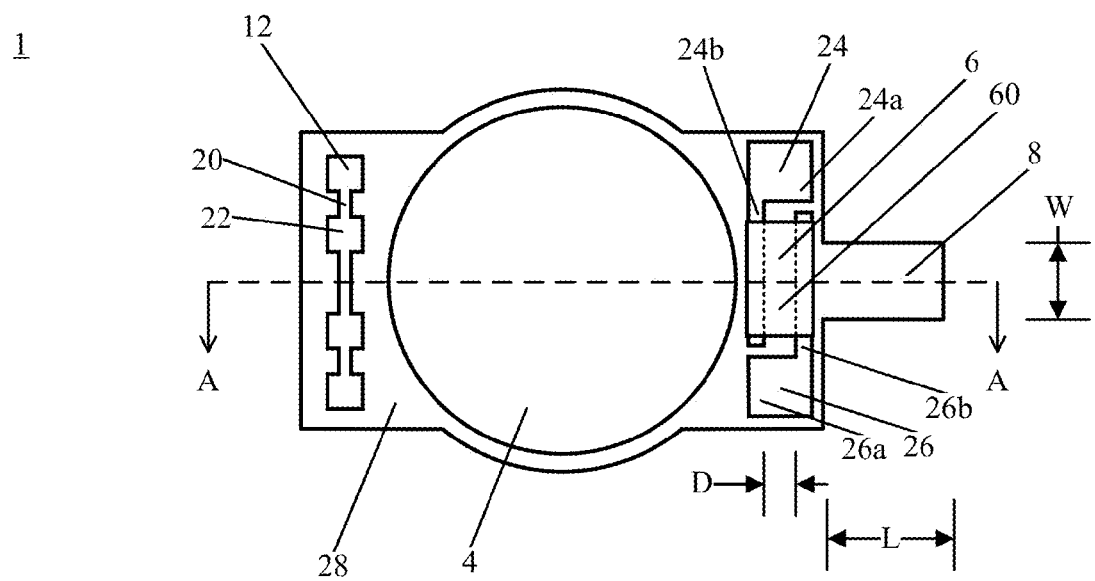
FIG. 13 shows a top view of a radiometer.
Figure 14:
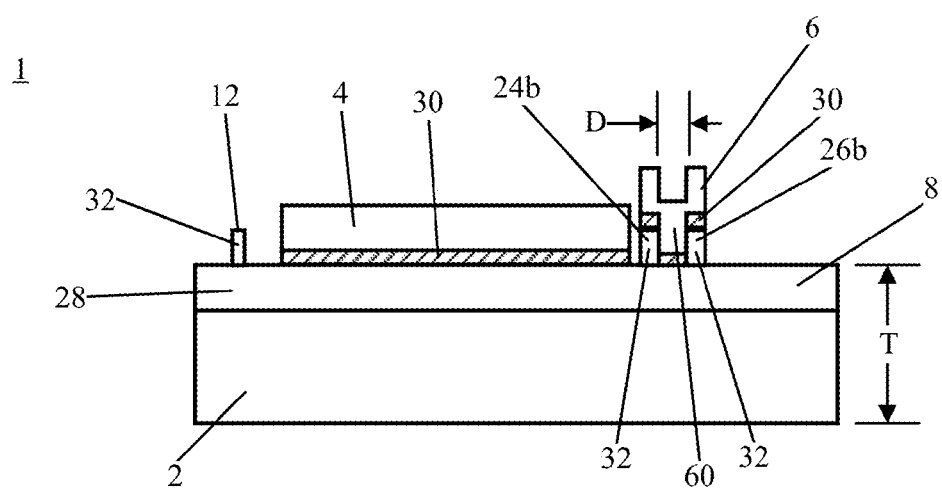
FIG. 14 shows a cross-section of the radiometer shown in FIG. 13.

According to an embodiment, as shown in FIG. 13 (top view) and FIG. 14 (cross-section along line A-A in FIG. 13), radiometer 1 includes thermal member 6 that includes resistor layer 60 disposed on first electrode 24 and second electrode 26. First electrode 24 includes pad 24a (exposed by resistor layer 60) and projection 24b, which is interposed between dielectric layer 28 and catalyst layer 30. Second electrode 26 includes pad 26a (exposed by resistor layer 60) and projection 26b, which is interposed between dielectric layer 28 and catalyst layer 30. It is contemplated that an alternative embodiment of radiometer 1 includes projection 24b or projection 26b being partially or completely exposed (i.e., not covered) by resistor layer 60. Here, pad 24a and pad 26b provide an electrical connection point for thermal member 6. Further, first electrode 24 and second electrode 26 of thermal member 6 are spaced apart at distance D. Distance D can be selected during formation of thermal member 6 such to vary a resistance of thermal member 6 by defining a volume in resistor layer 6 through which current supplied to first electrode 24 (or second electrode 26) resistively flows through resistor layer 60. Alternatively, distance D can be chosen so that thermal member 6 has a selected resistance value at a certain temperature or has a known value of resistance as a function of temperature so that as a temperature of radiometer 1 varies, a resistance value of thermal member 6 varies and can be determined (e.g., by measuring resistance).

Figure 15:
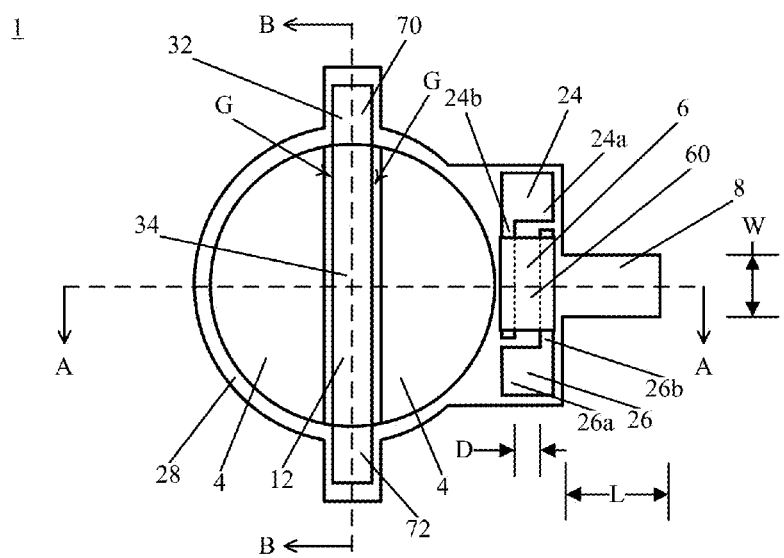
FIG. 15 shows a top view of a radiometer.
Figure 16:
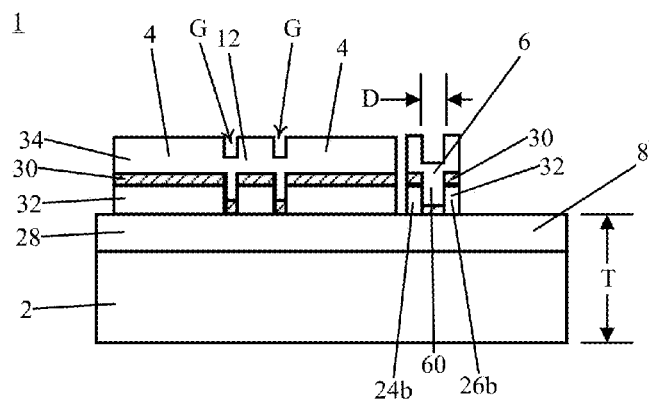
FIG. 16 shows a cross-section along line A-A of the radiometer shown in FIG. 15.
Figure 17:
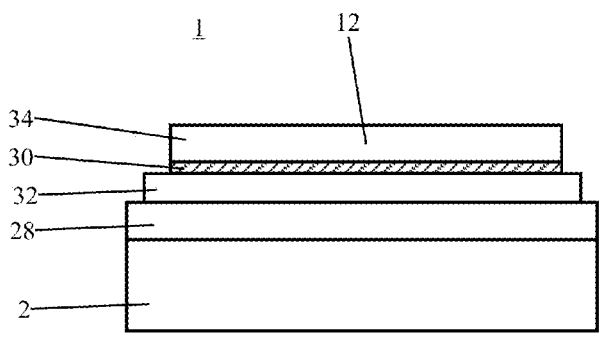
FIG. 17 shows a cross-section along line B-B of the radiometer shown in FIG. 15.

In an embodiment, as shown in FIG. 15 (top view), FIG. 16 (cross-section along line A-A in FIG. 15), and FIG. 17 (cross-section along line B-B in FIG. 15), radiometer 1 includes thermal regulator 12 having absorber layer 34 disposed on catalyst layer 30, which is disposed on metal layer 32. Metal layer 32 extends in a direction along line B-B and has electrode 70 and electrode 72 disposed at opposing ends thereof. Similarly, radiation absorber 4 includes absorber layer 34 disposed on catalyst layer 30, which is disposed on metal layer 32. Gap G disposed on opposing sides of thermal regulator 12 separates radiation absorber 4 from thermal regulator 12. Moreover, absorber layer 34 disposed on thermal member 12 and radiation absorber 4 can be continuous as shown in FIGS. 15, 16, and 17. In some embodiments (not shown), absorber layer 34 disposed on thermal member 12 is discontinuous with absorber layer 34 disposed on radiation absorber 4. Absorber layer 34 absorbs optical radiation, and thermally communicates energy deposited in absorber layer 34 via such absorption to substrate 2. Electrodes 70, 72 provide an electrical connection point for thermal regulator 12.

Figure 18:
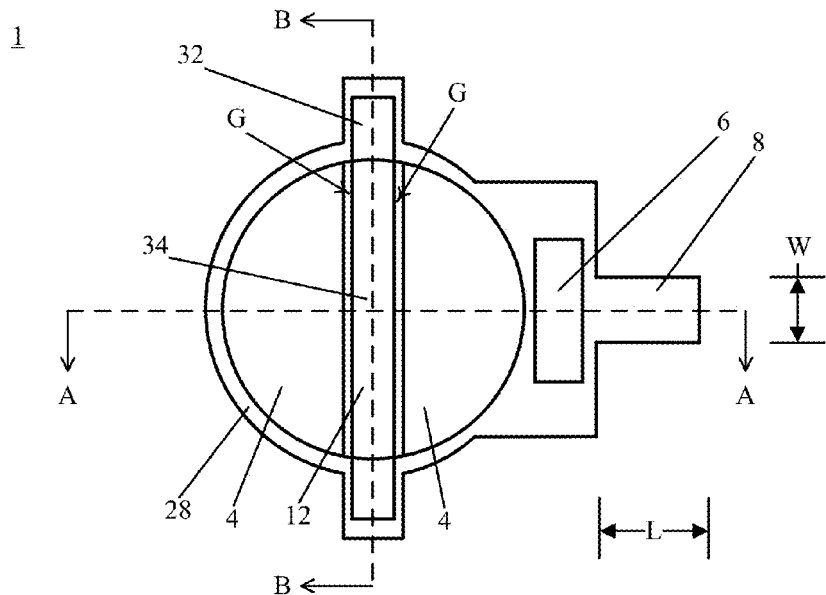
FIG. 18 shows a top view of a radiometer.
Figure 19:
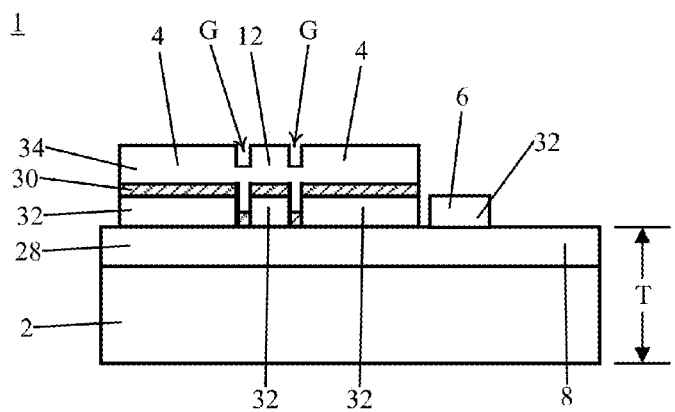
FIG. 19 shows a cross-section along line A-A of the radiometer shown in FIG. 18.
Figure 20:
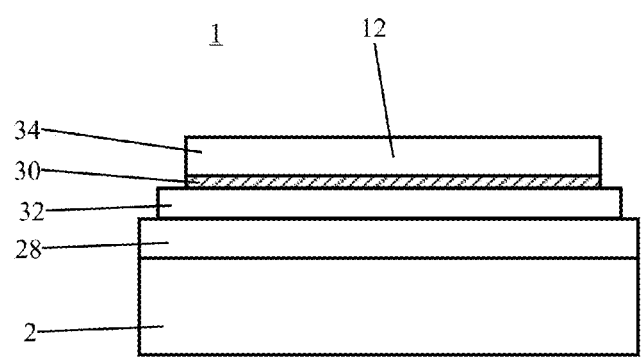
FIG. 20 shows a cross-section along line B-B of the radiometer shown in FIG. 18.

According to an embodiment, shown in FIGS. 18, 19, and 20, radiometer 1 includes thermal member 6 that includes metal layer 32 disposed on dielectric layer 28.

Radiometer 1 includes substrate 2. Substrate 2 can include any material that can effectively be processed (e.g., micromachined, including lithography and the like) to form a support structure for radiation absorber 4, thermal member 6, thermal regulator 12, or thermal link 8.

In a particular embodiment, substrate 2 includes a semiconductor. An exemplary semiconductor is an element from group 11, 12, 13, 14, 15, or 16 (IUPAC nomenclature, which respectively is identical to group I, II, III, IV, V, or VI) of the periodic table such as a Si, Ga, Ge, As, In, Sn, Sb, Te, At, Hf, Zn, and the like, or a combination thereof. According to an embodiment, substrate 2 is a compound semiconductor such as SiC, SiGe, GaN; a group 13-15 (also referred to as a group III-V) semiconductor such as AlSb, AlAs, Aln, AlP, BN, GaSb, GaAs, GaN, GaP, InSb, InAs, InN, InP, and the like; a group 12-16 (group II-VI) semiconductor such as CdSe, CdS, CdTe, ZnO, ZnSe, ZnS, ZnTe, and the like; a group 11-17 (group I-VII) semiconductor such as CuCl and the like; a group 14-16 (group IV-VI) semiconductor such as PbS, PbTe SnS, and the like; a layer semiconductor such as $PbI_2$, $MoS_2$, GaSe, and the like; an oxide semiconductor such as CuO, $Cu_2O$, and the like; (Al,Ga)N, (Al,Ga)As, (In,Ga)As, (Al,Ga)Sb, (In,Ga)Sb, as well as nitride, arsenide, antimonide quaternary III-V alloys, or a combination comprising at least one of the foregoing. Examples of II-VI alloys include, but are not limited to CdSe, CdTe, CdS, ZnSe, and combinations thereof. Examples of Group III-V ternary alloys include, but are not limited to, (Ga,Al)As, (In,Ga)As, and combinations thereof. Exemplary Group III-V quaternary alloys include (Ga,In)(As,P), (In,Al,Ga)Sb, and the like. Exemplary Group III-nitride alloys include (Ga,Al)N, (Ga,In)N, (Al,In)N, (Ga,Al,In)N, and combinations thereof. Quaternary alloys of the above may also be employed.

Substrate 2 also can include a supplemental element such as C, H, N, Li, Na, K, Mg, Ca, Sr, Ba, Bi, B, Al, P, S, O, and the like in an amount typically less than an amount of the semiconductor. In an embodiment, substrate 2 includes silicon, and the silicon is optionally doped. According to an embodiment, the semiconductor is an intrinsic semiconductor or an extrinsic semiconductor doped with a selected dopant, e.g., a p-dopant or an n-dopant. In one embodiment, the substrate includes a p-dopant. In another embodiment, substrate 2 includes an n-dopant. In a particular embodiment, substrate 2 is p-doped Si. In one embodiment, substrate 2 is n-doped Si. Substrate 2 can be produced from, e.g., commercially available semiconductor grade p-doped Si having a particular crystalline orientation, e.g., having Miller indices <111>, <100>, and the like. Substrate 2 can be amorphous, polycrystalline, or a single crystal. In an embodiment, substrate 2 has a stacked structure that includes a plurality of semiconductor layers such as by forming films as SiGe/Si/SiGe/Si on a Si substrate. In some embodiments, substrate 2 includes crystalline domains among amorphous material.

In another embodiment, substrate 2 includes a glass, pyrex, sapphire, polymer, ceramic, or an electrically conductive material, e.g., a metal. The substrate can be electrically conductive, semiconductive, or electrically insulating.

A thermal conductance of substrate 2 can be selected by choice of a composition of substrate 2 as well as a geometrical shape or size of substrate 2.

Dielectric layer 28 disposed on substrate 2 generally isolates substrate 60 from, e.g., contamination or deterioration during formation of radiation absorber 4. In an embodiment, dielectric layer 28 electrically insulates substrate 2 from metal layer 32. Dielectric layer 28 can include an oxide of an element in substrate 2 or independently can be an oxide of a semiconductor material such as $SiO_2$. According to an embodiment, dielectric layer 28 is an oxide such as an oxide that includes an element from substrate 2, e.g., an oxide of the semiconductor (also referred to herein as a semiconductor oxide). In an embodiment, substrate 2 includes Si, and dielectric layer 28 includes silicon dioxide ($SiO_2$). Additional dielectric layer 28 materials include gallium oxide ($GaO_3$), aluminum oxide ($Al_2O_3$), or alloys thereof, oxides of compounds from Groups III and V or alloys thereof, and the like. Exemplary oxides in dielectric layer 28 also include ZnO, $HfO_2$, $SnO_2$, $In_2O_3$, $Zn_2SnO_4$, $Ga_2O_3$, $Al_2O_3$, and the like. In an embodiment, dielectric layer 28 is a product of oxidation of a portion of substrate 2 to produce the semiconductor oxide. According to one embodiment, the oxide is a product of rapid thermal oxidation of substrate 2 so that the oxide (dielectric layer 28) is derived from substrate 2. In another embodiment, the oxide is a product of low temperature oxidation of substrate 2 to produce an oxide. In a further embodiment, the oxide is a product of depositing the oxide on substrate 2, which may or may not involve oxidation of substrate 2. In a certain embodiment, dielectric layer 28 includes $SiO_2$ as the oxide, which is a product of oxidation of substrate 2 that includes Si. In some embodiments, dielectric layer 28 includes a semiconductor oxide, a ceramic (e.g., $ZrO_2$, $Al_2O_3$, SiC, $Si_3N_4$, BN, $BaTiO_3$, and the like), a glass, a polymer, or a combination thereof.

In various embodiments, radiation member 4, thermal member 6, or thermal regulator 12 include metal layer 32. Metal layer is disposed on dielectric layer 28 and includes, e.g., a conductive material. Exemplary conductive materials include a metal such as a transition metal, alkaline earth metal, alkali metal, rare earth metal, metal carbide, metal oxide, metal sulfide, or a combination thereof. Exemplary metals include Zr, Hf, Ti, V, Cr, Mn, Fe, Co, Ni, Cu, Zn, Nb, Mo, Tc, Ru, Rh, Pd, Ag, Cd, Ta, W, Re, Os, Ir, Pt, Au, Li, Na, K, Be, Mg, Ca, Sr, Ba, Gd, and the like. The metal layer can be a composite that include the metal and a non-metal (e.g., graphene, carbon nanotubes, carbon black, and the like).

Catalyst layer 30 is disposed on dielectric layer 28 or metal layer 32. In some embodiments, catalyst layer 30 is disposed directly on substrate 2. Catalyst layer 30 includes a catalyst that aids formation of certain radiation absorber materials. Exemplary catalysts include a metal (e.g., Zr, Hf, Ti, V, Cr, Mn, Fe, Co, Ni, Cu, Zn, Nb, Mo, Tc, Ru, Rh, Pd, Ag, Cd, Ta, W, Re, Os, Ir, Pt, Au, Li, Na, K, Be, Mg, Ca, Sr, Ba, Gd), metal oxide (e.g., $Al_2O_3$), or a combination thereof. In an embodiment, the catalyst includes a metal oxide and metal. In one embodiment, the catalyst is $Al_2O_3$ and Fe.

In an embodiment, radiation absorber 4, thermal member 6, thermal regulator 12, or a combination thereof includes a radiation absorbing material. The radiation absorbing material absorbs optical radiation. As used herein, optical radiation refers to radiation having a wavelength from 200 nanometers (nm) to 500 micrometers (μm). Exemplary radiation absorbing materials include carbon nanotubes, carbon black, gold black, silicon black, nickel phosphorous. In an embodiment, the radiation absorbing material is a plurality of carbon nanotubes. The carbon nanotubes are tubular fullerene structures having open or closed ends and include single walled nanotubes or multi-walled nanotubes, e.g., double walled nanotubes, triple walled nanotubes, and the like.

The carbon nanotubes have an average particle size in at least one dimension, of less than one micrometer (μm). As used herein "average particle size" refers to the number average particle size based on a smallest linear dimension of the particle (sometimes referred to as "diameter"). Particle size, including average, maximum, and minimum particle sizes, can be determined by an appropriate method of sizing particles such as, for example, static or dynamic light scattering (SLS or DLS) using a laser light source. Carbon nanotubes can have an average particle size of about 1 to about 900 nanometers (nm), specifically 5 to 250 nm, more specifically about 10 to about 150 nm, more specifically about 50 to about 125 nm, and still more specifically about 75 to about 100 nm. The carbon nanotubes can be monodisperse, where all carbon nanotubes are of the same size with little variation, or polydisperse, where the carbon nanotubes have a range of sizes and are averaged. Generally, polydisperse carbon nanotubes are used. Carbon nanotubes of different average particle size may be used, and in this way, the particle size distribution of the carbon nanotubes can be unimodal (exhibiting a single distribution), bimodal exhibiting two distributions, or multi-modal, exhibiting more than one particle size distribution. The carbon nanotubes can have an aspect ratio (i.e., a ratio of length to diameter) of greater than or equal to 2, specifically greater than or equal to 10, more specifically greater than or equal to 100, further specifically greater than or equal to 500, and still more specifically greater than or equal to 1000.

The carbon nanotubes can be arranged in a random or ordered geometrical configuration in radiation absorber 4, thermal member 6, thermal regulator 12, or a combination thereof. According to an embodiment, the carbon nanotubes are mutually aligned with respect to the substrate. That is, a length axis of the carbon nanotubes generally make a similar angle with respect to the substrate or are disposed such that the length axes of the carbon nanotubes fall within a narrow range of angles with respect to the substrate. In an embodiment, the carbon nanotubes are vertically aligned with respect to the substrate such that an angle between the substrate and length axes of the carbon nanotubes (referred to as an alignment angle) is from 45° to 90°, specifically from 70° to 90°, more specifically from 85° to 90°. Micrographs of vertically aligned carbon nanotubes (VACNTs) disposed on a substrate are shown in FIGS. 31 through 34, inclusive.

In an embodiment, the radiation absorber material includes vertically aligned carbon nanotubes having broad band absorption, e.g., from 200 nm to 500 μm. Such material is optically black with an absorptance of greater than or equal to, e.g., 0.999 over a wide wavelength range. Moreover, the radiation absorber material is compatible with lithographic processing and has high thermal diffusivity. As such, the VACNTs are a super-dark absorber of, e.g., extreme ultraviolet, ultraviolet, visible, infrared, or radiofrequency energy.

Further, the VACNTs are an approximate black body. Emissivity is defined as the ratio of the energy radiated by an object compared to that of a black body. A black body is a theoretical material that absorbs all incident light (no light reflected or transmitted), at all wavelengths. Therefore, a black body has an absorptance of one for all wavelengths. The VACNTs can be arranged in vertically aligned aggregates or can all be aligned in substantially the same direction so that, e.g., absorber layer 34 (of, e.g., radiation absorber 4, thermal member 6, thermal regulator 12) has uniform geometry of VACNTs to provide an absorptivity substantially that of a black body. In some embodiments, the VACNTs have an absorptance from 0.98 to 0.999 from extreme ultraviolet (e.g., 200 nm) to far infrared (e.g., 500 μm) bands. Such absorptance is significantly higher than conventional "black" materials, e.g., a super-dark coating or paint. Furthermore, the absorptance of the VACNTs is nearly wavelength-independent across a wide spectral range.

The vertical alignment of VACNTs provides additional benefits including selectivity over number density (e.g., sparseness or compactness on substrate 2), as well as control over an alignment angles of the carbon nanotubes and a width in a distribution of alignment angles of the carbon nanotubes.

Figure 35:
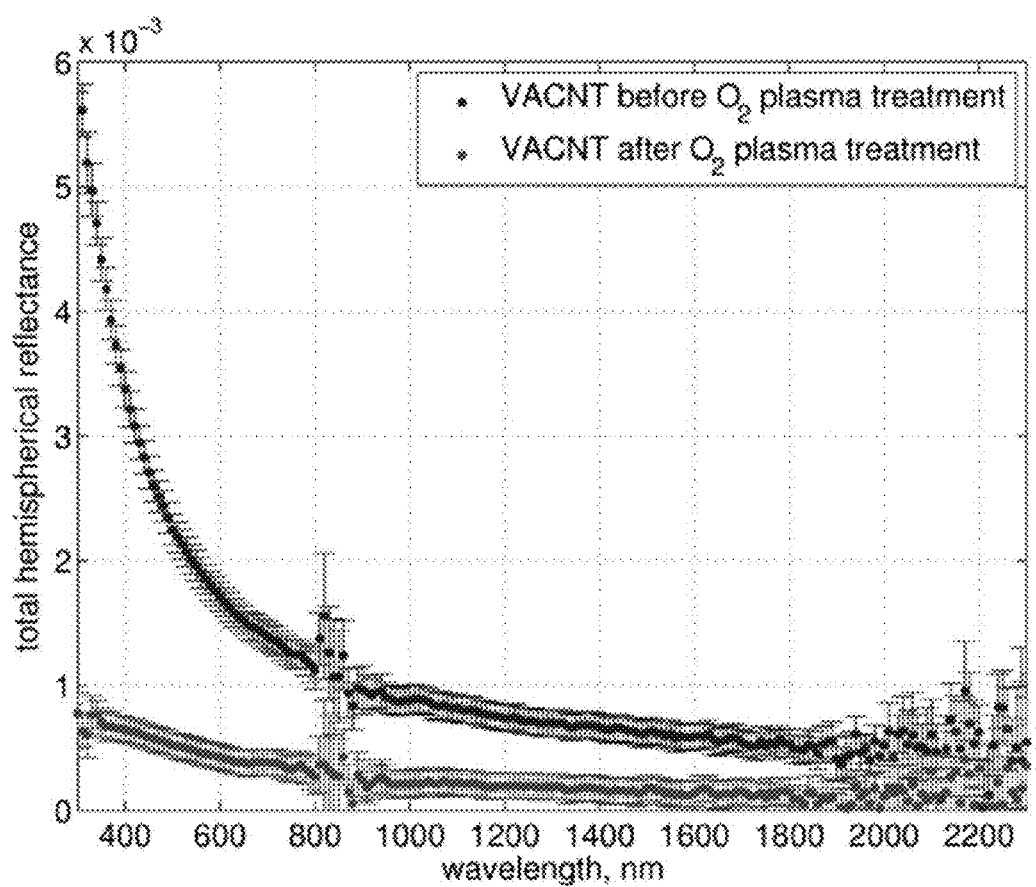
FIG. 35 shows a graph of total hemispherical reflectance versus wavelength for a plurality of carbon nanotubes.

In general, light may be reflected, transmitted, or absorbed by a material. The density or alignment of the VACNT suppresses reflection. According to Fresnel's law, reflection is reduced when an index of refraction of an object is close to that of air. While this is difficult to achieve from a solid or high-density material, materials with lower material density, such as the VACNTs provide decreased permissivity over solid materials. Because permissivity is proportional to a square of an index of refraction, a decrease in permissivity results in a decrease of the index of refraction, and results in a decrease in reflectance. As such, the VACNTs have a low reflectance (e.g., as shown in FIG. 35, to be described later). In an embodiment, the VACNTs have an extremely low reflectance over a broad wavelength range and approximate a theoretical black body. In one embodiment, the VACNTs included in absorber layer 34 are present from 2 volume percent (vol %) to 50 vol %, based on a total volume of the absorber layer, with a residual amount of the total volume including, e.g., air.

In addition to homogeneous sparseness, tube alignment within the VACNTs may also play a role in achieving black body behavior. CNTs which are vertically aligned perpendicular to a base substrate generally take on an angle of up to approximately twenty degrees (20°) with respect to orthogonal. Because CNTs are good absorbers over much of the EM spectrum, and this angle of tilt is relatively small, significant reflection is unlikely, and light is generally absorbed as it propagates further into the material.

Additionally, the carbon nanotubes have a high thermal conductivity, e.g., along a length of axis of the nanotube. In an embodiment, a density of VACNTs is controlled to, e.g., an inter-nanotube spacing of approximately a few nm, and the VACNTs are continuously disposed over an entire area of substrate 2 (or whatever material the VACNTs are disposed). Moreover, absorber layer 34 is continuous from top to bottom, i.e., along a direction perpendicular to a surface of substrate 2. A spacing between the carbon nanotubes is selected based on a desired density and thermal conduction. The VACNTs provide a smooth surface to absorber layer 34 and also conforms to irregular surfaces for good thermal interfacial properties. The VACNTs can synthesized in a surface patterns (e.g., matching a lithographic pattern of underlying catalyst layer 30). Further, a thermal conductivity of the VACNTs can be, e.g., greater than 600 Watts per milliKelvin. The VACNTs also can be grown to arbitrary, predetermined heights with a high anisotropic thermal diffusivity (e.g., greater than 40:1, longitudinal to transverse ratio).

While radiation absorber 4 is configured to absorb optical radiation, thermal member 6 is configured to change electrical resistance in response to a change in temperature of the radiometer. Accordingly, thermal member 6 can include metal layer 32, absorber layer 34, catalyst layer 30, or a combination thereof. In an embodiment, thermal member 6 includes metal layer 32, catalyst layer 30, and absorber layer 34, as in FIG. 13. Here, absorber layer 34 forms resistor layer 60. In a particular embodiment, the absorber layer includes VACNTs, and radiation absorber 4 includes a radiation absorber material that has a selected optical absorption from 200 nm to 500 µm. Thermal member 6 with the VACNT has a high temperature sensitivity at a cryogenic temperature. Metal layer 30 can include a metal such as, e.g., Mo.

In another embodiment, thermal member 6 includes metal layer 30, as in FIG. 18. Here, metal layer 30 provides thermal member 6 with high temperature sensitivity. Moreover, the metal in metal layer 30 can be subjected to a temperature either greater than or less than its critical temperature (Tc) (e.g., from 0.5 Kelvin (K) to 8 K) at which metal layer 30 exhibits superconductivity. As such, radiometer 1 can be operated at a temperature either greater than or less than the critical temperature (Tc) for metal layer 30. When the temperature is greater than Tc, metal layer 30 is electrically conductive, and below Tc metal layer 30 is superconductive. As a result, thermal member 6 can be a transition-edge sensor (TES). Moreover, during production of radiometer 1, metal layer 30 is formed before radiation absorber 4 (and absorber layer 34) such that when metal layer 30 includes Mo, the Tc of the Mo increases during formation of the radiation absorber 4 so that metal layer 30 including Mo is converted to a higher temperature superconductor.

In some embodiments, thermal member 6 includes a metal alloy. Exemplary metal alloys include alloys of the metal above described, e.g., RhFe, $Ru_xO_y$ (rubidium oxide). In an embodiment, thermal member 6 includes a metal oxy-nitride as disclosed in U.S. Pat. Nos. 5,363,084 and 5,367,285, the disclosures of which are incorporated herein in their entirety.

According to an embodiment, thermal member 6 includes a doped semiconductor, e.g., as above described. An exemplary doped semiconductor is germanium doped with arsenic, e.g., neutron transmutation-doped Ge. In neutron transmutation doping, neutrons from a reactor pass through a Ge crystal such that some Ge atoms are transmuted to As atoms. Such transmutation provides a crystalline material with a uniform doping distribution of dopant.

Thermal regulator 12 is configured to receive electrical power and to heat radiometer 1. Thermal regulator 12 can include metal layer 32, absorber layer 34, catalyst layer 30, or a combination thereof. In an embodiment, thermal regulator 12 includes metal layer 32, catalyst layer 30, and absorber layer 34, as in FIGS. 15, 16, and 17. In another embodiment, thermal regulator 12 includes metal layer 30, as in FIGS. 13 and 14. Therefore, thermal regulator can independently include materials recited for thermal member 6.

Thermal link 8 is configured to thermally communicate energy from radiometer 1 to thermal reference 10. Thermal link 8 can independently include any material recited for substrate 2 or dielectric layer 28, including an oxide or nitride thereof. In an embodiment, thermal link 8 is a same material as substrate 2. According to an embodiment, thermal link 8 includes silicon, silicon dioxide, or a combination thereof. Thermal link 8 has an thermal conductance that is selectable via length L, width W, thickness T, or composition thereof.

According to an embodiment, the radiometer includes the substrate, the radiation absorber disposed on the substrate to absorb radiation, the thermal member disposed on the substrate to change electrical resistance in response to a change in temperature of the radiometer, and the thermal link to connect the radiometer to a thermal reference. The radiation absorber, the thermal member, or a combination thereof includes a plurality of carbon nanotubes such that the carbon nanotubes are mutually aligned with respect to the substrate. Accordingly, the radiometer is configured to detect optical power, and the change in temperature of the thermal member occurs in response to absorption of radiation by the absorber, to heating by the thermal regulator, or a combination comprising at least one of the foregoing. Additionally, the radiometer include the thermal regulator disposed on the substrate such that the thermal regulator includes a metal, a plurality of carbon nanotubes that are mutually aligned with respect to the substrate, or a combination thereof. The radiation absorber can include the plurality of carbon nanotubes, and the thermal member can include a metal. Moreover, the thermal member can further include a plurality of carbon nanotubes. In some embodiments, the radiation absorber, the thermal member, and the thermal regulator are separately disposed on the substrate. In a particular embodiment, the radiation absorber and the thermal regulator are integrally disposed on the substrate as a single member, and the single member and the thermal member are separately disposed on the substrate. In other embodiments, the radiation absorber and the thermal member are integrally disposed on the substrate as a single member, and the single member and the thermal regulator are separately disposed on the substrate. According to an embodiment, the thermal member comprises the plurality of carbon nanotubes, and the radiation absorber comprises a material having a selected optical absorption from 200 nm to 500 µm. According to an embodiment, the carbon nanotubes are vertically aligned with respect to the substrate.

In an embodiment, the radiometer includes the substrate, the radiation absorber disposed on the substrate to absorb radiation and including a first plurality of carbon nanotubes, the thermal member disposed on the substrate to change electrical resistance in response to the change in temperature of the radiometer, the thermal regulator disposed on the substrate to heat the radiometer and including a metal and a second plurality of carbon nanotubes, and the thermal link to connect the radiometer to a thermal reference. The first plurality of carbon nanotubes and the second plurality of carbon nanotubes are mutually aligned with respect to the substrate, and the radiometer is configured to detect optical power.

Figure 21A:
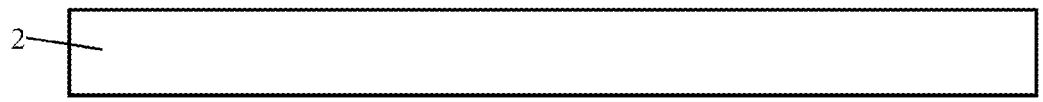
FIGS. 21A-21F show formation of a radiometer.
Figure 21B:
Figure 21C:
Figure 21D:
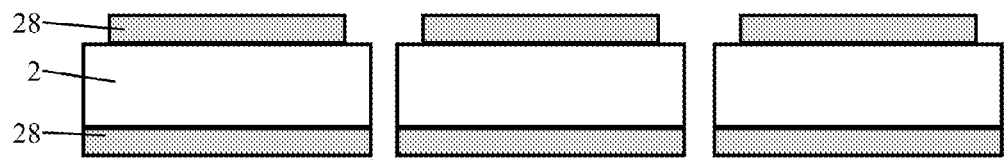
Figure 21E:
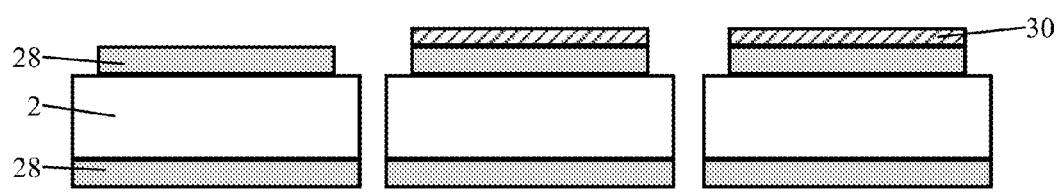
Figure 21F:
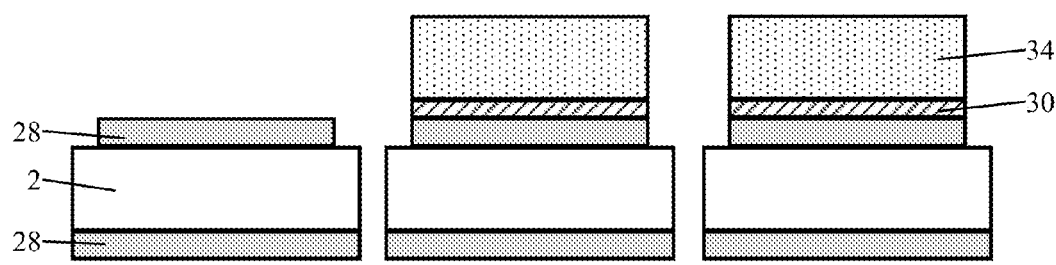

Radiometer 1 can be made in various ways. In some embodiments, microfabrication or nanofabrication processing is used to make radiometer 1. According to an embodiment, as shown in FIGS. 21A through 21G, substrate 2, e.g., a silicon wafer is provided. Substrate 2 can be polished, shaped, and the like to provide a uniform surface for disposition of elements of radiometer 1. Substrate 2 is lithographically patterned using a photoresist and subjected to deep reactive ion etching to micromachine the silicon (FIG. 21B). Dielectric layer 28, e.g., silicon dioxide, is deposited on substrate 2 (FIG. 21C) by growing the oxide in a tube furnace to a selected thickness (e.g., 500 nm), and dielectric layer 28 subsequently is patterned (FIG. 21D). Thereafter, catalyst layer 30 is selectively deposited (e.g., through a shadowmask) on dielectric layer 28 (FIG. 21E). Absorber layer 34 is formed on catalyst layer 30 (FIG. 21F) to form radiometer 1. Optionally, electrode material (e.g., a metal such as Au, Mo, and the like) is deposited on certain portions of radiometer 1 to electrically connect, e.g., absorber layer 34 or thermal member 6.

Figure 22A:
FIGS. 22A-22I show formation of a radiometer.
Figure 22B:
Figure 22C:
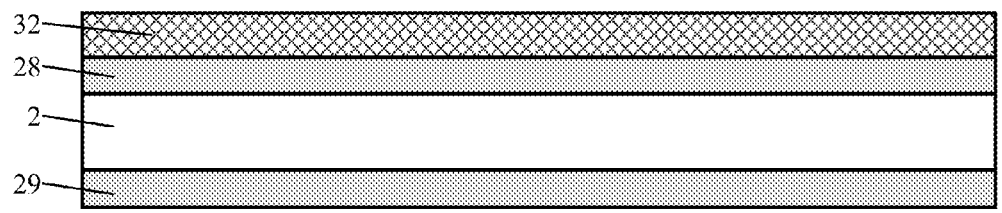
Figure 22D:
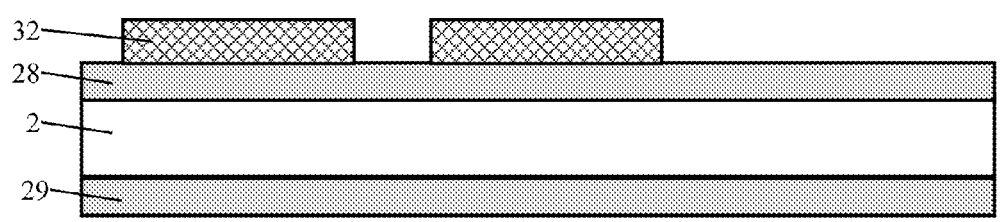
Figure 22E:
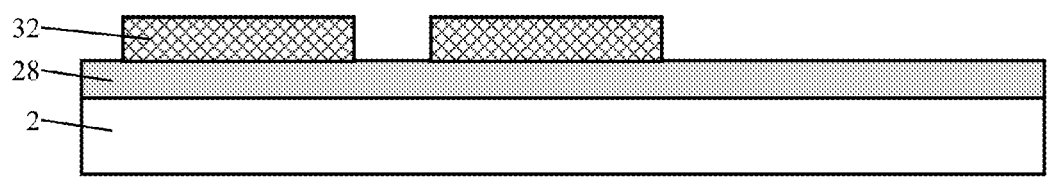
Figure 22F:
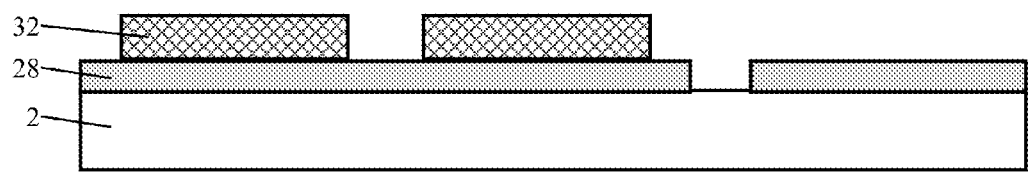
Figure 22G:
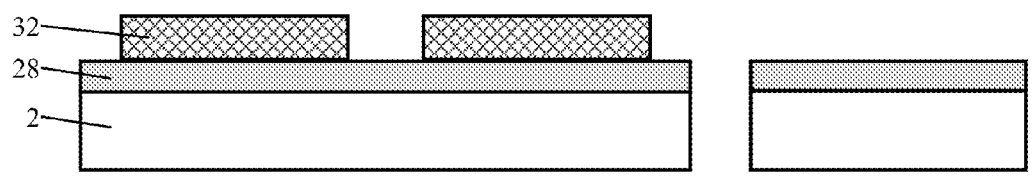
Figure 22H:
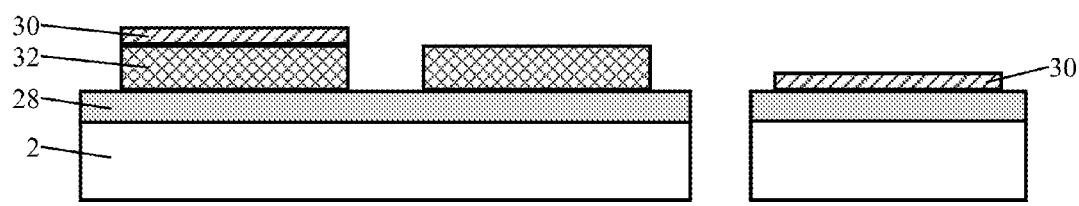
Figure 22I:
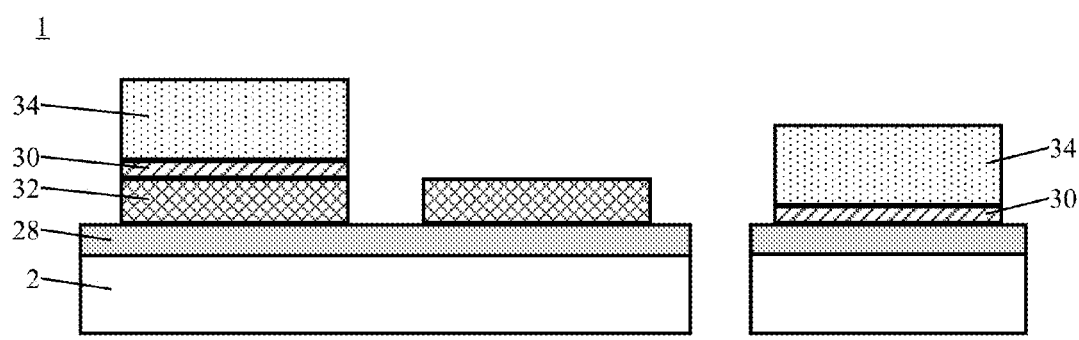

According to an embodiment, as shown in FIGS. 22A through 22I, a shadowmask is used to produce radiometer 1. Here, substrate 2, e.g., a silicon wafer is provided (FIG. 22A). Dielectric layers 28 and 29, e.g., silicon dioxide, are deposited on substrate 2 (FIG. 22B) by growing the oxide in a tube furnace to a selected thickness (e.g., 500 nm). Thereafter, metal layer 32 is deposited on dielectric layer 28 (FIG. 22C) by, e.g., sputtering a metal (e.g., Mo) on dielectric layer 28. Metal layer 32 is patterned (FIG. 22D), e.g., lithographically using a photoresist and subjecting metal layer 32 to wet etching. Dielectric layer 29 is subjected to reactive ion etching and removed from substrate 2 (FIG. 22E). Dielectric layer 28 then is subjected to photolithography to produce a pattern therein by removing a portion of the $SiO_2$ (FIG. 22F). Substrate 2 is subjected to deep reactive ion etching (FIG. 22G), and catalyst layer 30 is selectively deposited (e.g., through a shadowmask) on metal layer 32 or dielectric layer 30 (FIG. 22H). Absorber layer 34 is formed on catalyst layer 30 (FIG. 21G) to make radiometer 1.

Figure 23A:
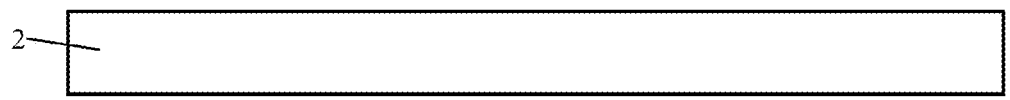
FIGS. 23A-23I show formation of a radiometer.
Figure 23B:
Figure 23C:
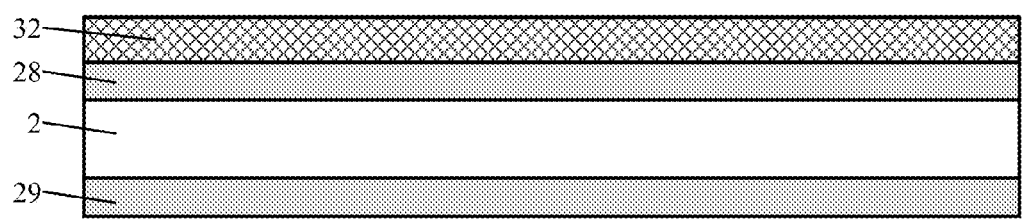
Figure 23D:
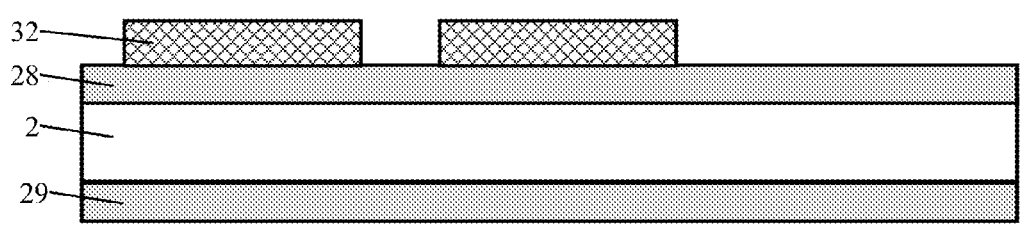
Figure 23E:
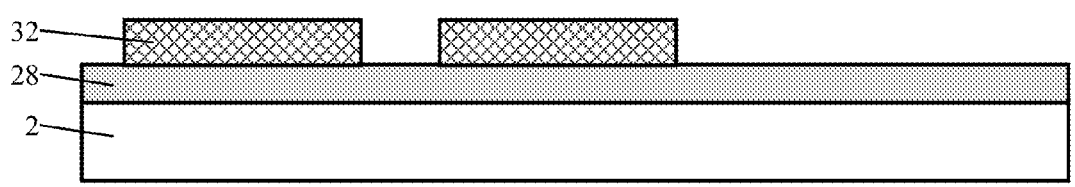
Figure 23F:
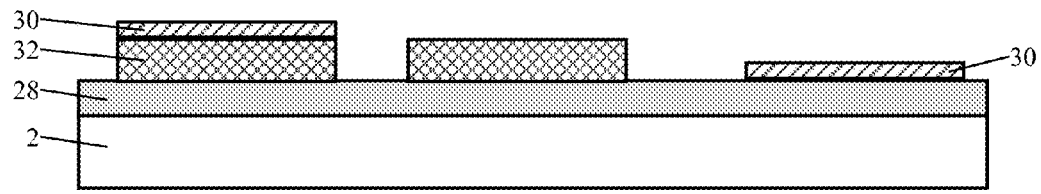
Figure 23G:
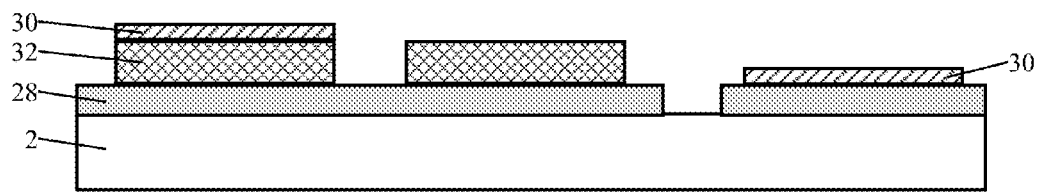
Figure 23H:
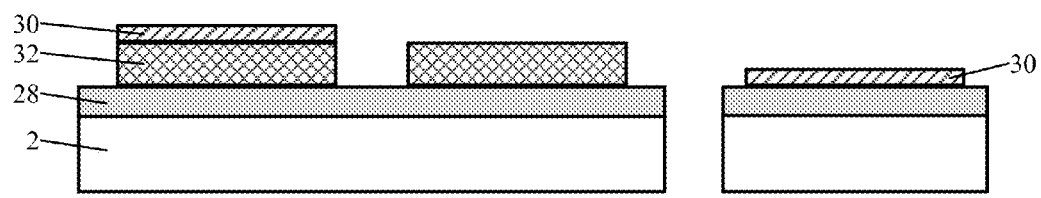
Figure 23I:
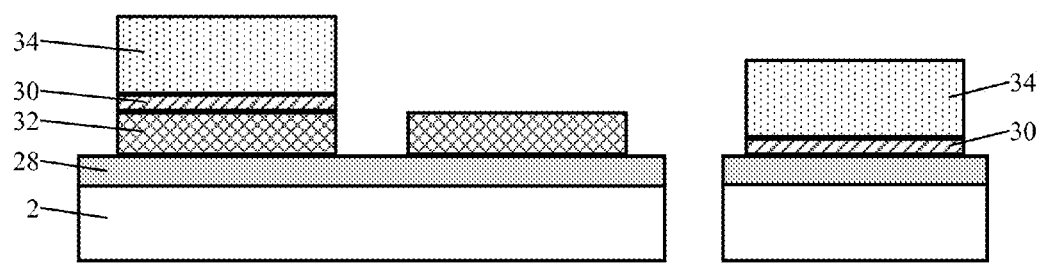

According to an embodiment, as shown in FIGS. 23A through 23I, a liftoff process is used to produce radiometer 1. Here, substrate 2, e.g., a silicon wafer is provided (FIG. 23A). Dielectric layers 28 and 29, e.g., silicon dioxide, are deposited on substrate 2 (FIG. 23B) by growing the oxide in a tube furnace to a selected thickness (e.g., 500 nm). Thereafter, metal layer 32 is disposed on dielectric layer 28 (FIG. 23C) by, e.g., sputtering a metal (e.g., Mo) on dielectric layer 28 to a selected thickness (e.g., 50 nm). Metal layer 32 is patterned (FIG. 23D), e.g., lithographically using a photoresist and subjecting metal layer 32 to wet etching. Dielectric layer 29 is subjected to reactive ion etching and removed from substrate 2 (FIG. 23E). Catalyst layer 30 is disposed on metal layer 32 and dielectric layer 30 and subjected to liftoff to form a pattern coinciding to certain portions of metal layer 32 and dielectric layer 30 (FIG. 23F). Dielectric layer 28 then is subjected to reactive ion etching to produce a pattern therein by removing a portion of the $SiO_2$ (FIG. 23G). Substrate 2 is subjected to deep reactive ion etching (FIG. 23H). Absorber layer 34 is formed on catalyst layer 30 (FIG. 21G) to make radiometer 1.

Figure 24A:
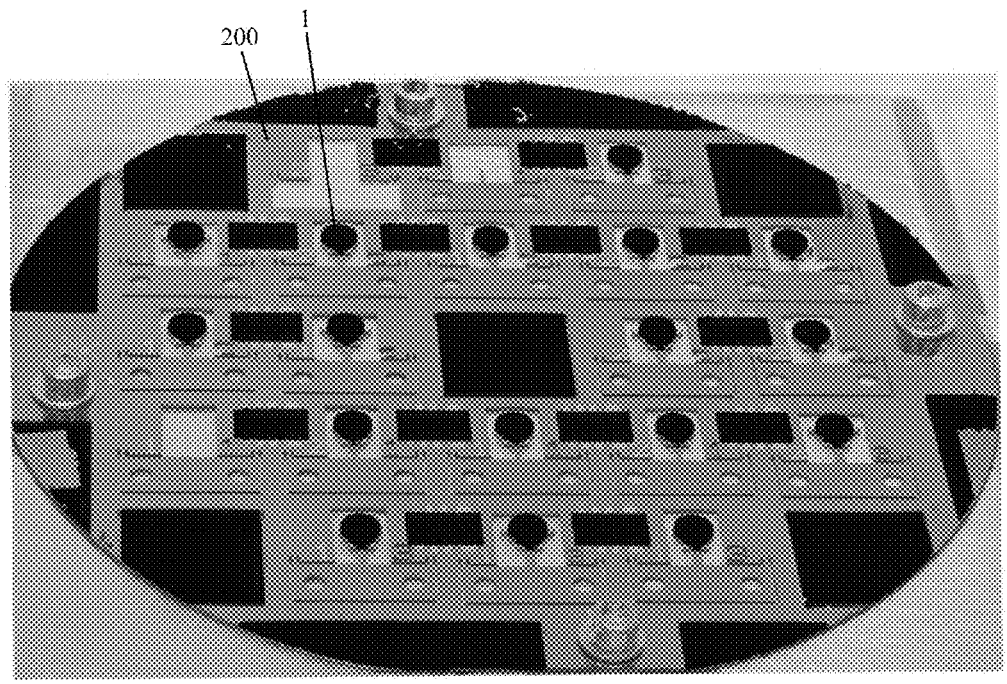
FIGS. 24A, 24B, 24C respectively show an array of radiometer on wafer, a perspective view of a radiometer, and a top view of a radiometer.
Figure 24B:
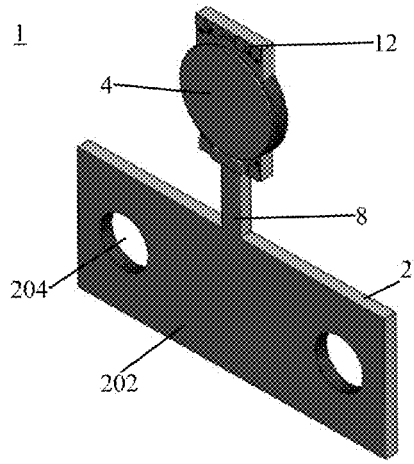
Figure 24C:
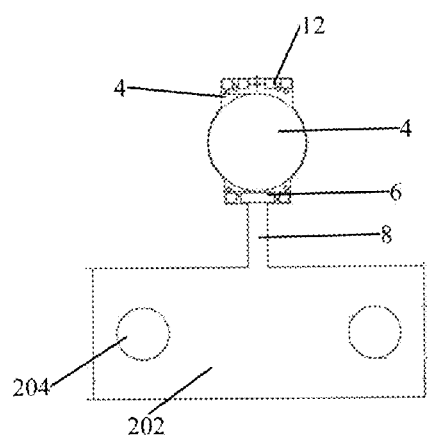

In an embodiment, a component (e.g., thermal member 6, radiation absorber 4, or thermal regulator 12) of radiometer 1 is lithographically defined. The substrate can be made from, e.g., a 76.2 mm (3 inch) diameter silicon wafer. It is contemplated that a plurality of radiometers 1 are produced on a wafer 200 as in FIG. 24A. FIGS. 24B and 24 C respectively show radiometer 1 having a mounting member 202 with hole 204 in thermal link 8. Hole 204 or mounting member 202 can be used with a fastener (e.g., a clamp, solder, adhesive, screw, and the like) to connect radiometer 1 to a thermal reference (not shown).

In an embodiment, absorber layer 34 includes a plurality of carbon nanotubes, specifically VACNTs in certain embodiments. The VACNTs can be produced in various manners such as thermal chemical vapor deposition of a hydrocarbon onto a prepatterned catalyst layer 30 that includes the catalyst. A plurality of thin metal films can be sequentially deposited by electron beam evaporation or other deposition technique to form catalyst layer 30 that can include a first metal (e.g., Al) that contacts substrate 2, dielectric layer 28, or metal layer 32. A second metal (e.g., a catalyst such as Fe, Mo, and the like) is deposited thereon, and the article is placed in a furnace. The temperature is increased under hydrogen or argon gas flow at various pressures. During this procedure, catalyst particles of the second metal may form on partially oxidized first metal (e.g., $Al_2O_3$). A hydrocarbon optionally with other gases (e.g., acetylene with hydrogen or argon, ethanol with hydrogen or argon, or methanol with hydrogen and argon, and the like) are passed over the catalyst particles and aligned carbon nanotubes grow. A height of carbon nanotubes can be controlled (e.g., within 10 nm) by selecting growth conditions such as gases present during growth.

Many factors affect optical absorption properties of the VACNTs, including growth method (CVD or PECVD), an underlayer ($SiO_2$, Mo, or Nb), catalyst, and height. In an embodiment, the VACNTs are subjected to an oxygen plasma, which can decrease reflectance of the VACNTs. Without wishing to be bound by theory, it is believed that subjecting VACNTs to an oxygen plasma reduces a reflectance of the carbon nanotubes by modifying a surface morphology by etching a top layer of the VACNTs whereby nanotube tips agglomerate. The reflectance of VACNTs depends on many variables, e.g., density, height, uniformity, or alignment. Such variables can be affected during oxygen plasma treatment, which can remove carbon impurities, randomly shorten or kink individual nanotubes, or cause carbon nanotube tip agglomeration. These effects can decrease reflectance by making the surface less uniform.

The radiometer has beneficial properties. The radiometer can have any shape, e.g., a cross-sectional shape that is circular, rectangular, polygonal, ellipsoidal, and the like, as well as any size, size, e.g., 3 mm diameter in circular cross-section and can be scaled to larger sizes. In an embodiment, the radiometer has a planar design in a small footprint that has a time constant, e.g., less than 1 ms.

A thermal conductance of the radiometer is determined largely by the substrate and thermal link. In particular, the thermal conductance G is given by $G=k(wt/l)$, where k is the thermal conductivity of the thermal link having width w, thickness t, and length l. Micromachining components of the radiometer allows control of geometry of the components, and particularly of the thermal link (L, W, or T).

In an embodiment, the radiation absorber is a near-ideal black body to absorb all wavelengths of light with substantially no reflectance at any wavelength. The radiometer has a reflectance less than or equal to $10^{-1}$, specifically less than $10^{-2}$, more specifically less than $10^{-3}$, and even more specifically less than $10^{-4}$, based on a total hemispherical reflectance, at a wavelength from 350 nm to 2400 nm. The radiation absorber can have an optical absorptance greater than or equal to 0.95, more specifically greater than or equal to 0.99, and further specifically greater than or equal to 0.999 for radiation at a wavelength from 200 nm to 500 μm.

A size of the radiation absorber can be, e.g., in the micrometer, millimeter, or centimeter range, e.g., having a 3 mm diameter. In a particular embodiment, the radiation absorber includes the absorber layer having radiation absorber material (e.g., VACNTs) for absorption of incident light. The radiation absorber can absorb light efficiently up to a damage threshold of the radiation absorbing material, which for VACNTs can be, e.g., 500 watts per square centimeter (W/cm2) or greater if the VACNTs are modified (e.g., by metallation, inclusion of functional groups, oxidation, and the like).

The VACNTs can have a specific heat greater than 400 Joules per kilogram per Kelvin (J/kg K), a density (e.g., less than 10 g/cm$^3$), or a thermal conductivity (e.g., greater than 400 W/mK). Low-density VACNTs can have a low index of refraction and a nanoscale surface roughness that can provide near-ideal optical absorption.

In an embodiment, an index of refraction of the absorber layer is less than 1.2, specifically, less than 1.1, more specifically less than 1.01. The absorber layer can have reflectance from 0.01% to 0.10%, based on a total amount of incident light. In particular, an absorber layer that includes VACNTs can have near unity absorptance over a broad range of wavelengths, e.g., absorptance from 0.999 to 0.9999, based on light having a wavelength from 200 nm to 500 µm.

Moreover, VACNTs have a super low reflectance as a result of long nanotubes that are present in a low-density nanostructure that occurs as an ordered array. The VACNTs can have deep pores that traverse the array. In some embodiments, the absorber layer (e.g., VACNTs) are birefringent to reflect differently for different light polarizations while having strong light absorption.

While some embodiments have an absorber layer that includes a high optical absorber, e.g., VACNTs, other embodiments include an absorber layer with a lower optical absorptance. Such lower optical absorptance can be from 0.5 to 0.95.

The absorber layer can have a thickness from 100 nm to 5 mm. Once grown on a substrate, the absorber layer (e.g., VACNTs) can be separated from the substrate to obtain a freestanding radiometer without a substrate. A volume-filling fraction of the absorber layer (based on a diameter and pitch of individual nanotubes of the VACNTs) allows a selectively tailorable index of refraction for the absorber layer. The filling fraction of carbon nanotubes can be from 0.5% to 5%, based on a total volume of the absorber layer. Carbon nanotubes that are part of the VACNTs can be spaced apart at a distance from 10 nm to 100 nm (based on a center-center distance of adjacent carbon nanotubes) with a carbon nanotube diameter from 1 nm to 100 nm.

According to an embodiment, the thermal member includes a metal layer, catalyst layer, absorber layer (resistor layer), or a combination thereof. The metal layer can be a first or second electrode with pads or projections, as in e.g., FIG. 11. The metal layer, e.g., including a thin film of Mo can include the projections for making electrical connection to a portion of VACNT. As such, the thermal member can be a thermistor. In an embodiment, the thermal member includes VACNTs, which have a negative temperature coefficient, and has a thermal sensitivity below, e.g., 10 K. It is contemplated that a density or height of the VACNTs effect the temperature sensitivity of the thermal member. A geometry of the Mo pads can be used to select an absolute resistance value at a temperature of interest.

The thermal regulator can include a metal layer, catalyst layer, absorber layer (resistor layer), or a combination thereof. Thus, the thermal regulator can resistively heat the radiometer. In an embodiment, the thermal regulator includes the metal layer that contains the metal (e.g., Mo) as a thin film. In some embodiments, the thermal regulator includes the metal layer and the absorber layer. A geometry, thickness, or composition of the thermal regulator determines a resistance of the thermal regulator such that a heating efficiency, e.g., watts dissipated by the thermal regulator during a period of time, can be selected. The heating Therefore, the radiometer can have a heating rate due to application of power to the thermal regulator that is rapid and identical or substantially identical to a temporal profile of the power applied to the thermal regulator.

Competing with heating the radiometer either by the thermal regulator or by absorption of optical radiation is thermal conduction from the radiometer to thermal reference. The thermal link governs the thermal conduction to the thermal reference, and dimensions (e.g., width, length, and thickness or diameter) of the thermal link provide for the thermal conductance of the thermal link. By varying thickness T, length L, or width W of the thermal link, the thermal conductance can be from 3 µW/K to 2800 µW/K at 4 K.

The radiometer can be operated over a range of temperatures, e.g., at a temperature less than 300 K, specifically less than 80, more specifically less than 80 K (e.g., 77 K), and less than 10 K (e.g., from 2 K to 4K). In an embodiment the radiometer is configured to detect a change in temperature at a temperature of the radiometer that is less than or equal to 80 Kelvin.

The heat capacity of the radiometer can be dominated by a volume of substrate (e.g., silicon) relative to the other components of the radiometer. The radiometer and thus the substrate can be relatively small compared to conventional electric substitution radiometers and have a correspondingly low heat capacity and fast time response. In an embodiment, the substrate can be substantially a same size or slightly larger than the radiation absorber.

A density or height of the VACNT affects a temperature sensitivity of the radiation absorber or radiometer. In some embodiments, the sensitivity of the radiation absorber to optical absorption is greater than or equal to 1 picoWatt (pW). The thermal member can have a resistance, e.g., from 100 Ohms (Ω) to 50 kΩ with a unitless sensitivity having a magnitude that is greater than or equal to, e.g., 1.5 at 4 K. The unitless sensitivity of the thermal member (also referred to as a temperature coefficient of resistance α) is given by α=T/R(dR/dT), where R is the electrical resistance of thermal member (e.g., VACNTs) measured at temperature T.

The radiometer has a fast response time to optical absorption or thermal heating by the thermal regulator. A time constant of the radiometer is less than or equal to 1 millisecond (ms), specifically less than or equal to 750 s, and more specifically less than or equal to 500 µs. Some conventional electrical substitution radiometers typically have a time constant that is seconds to minutes due to a large heat capacity.

The radiometer herein has several advantages. The radiometer can be made at a low cost and with small overall dimensions for a given radiation absorber area. Since the radiometer has a short time constant, the radiometer is useful in Fourier transform (FT) based measurements. Additionally, the radiometer can be used in a detector array or an imaging device.

Figure 25:
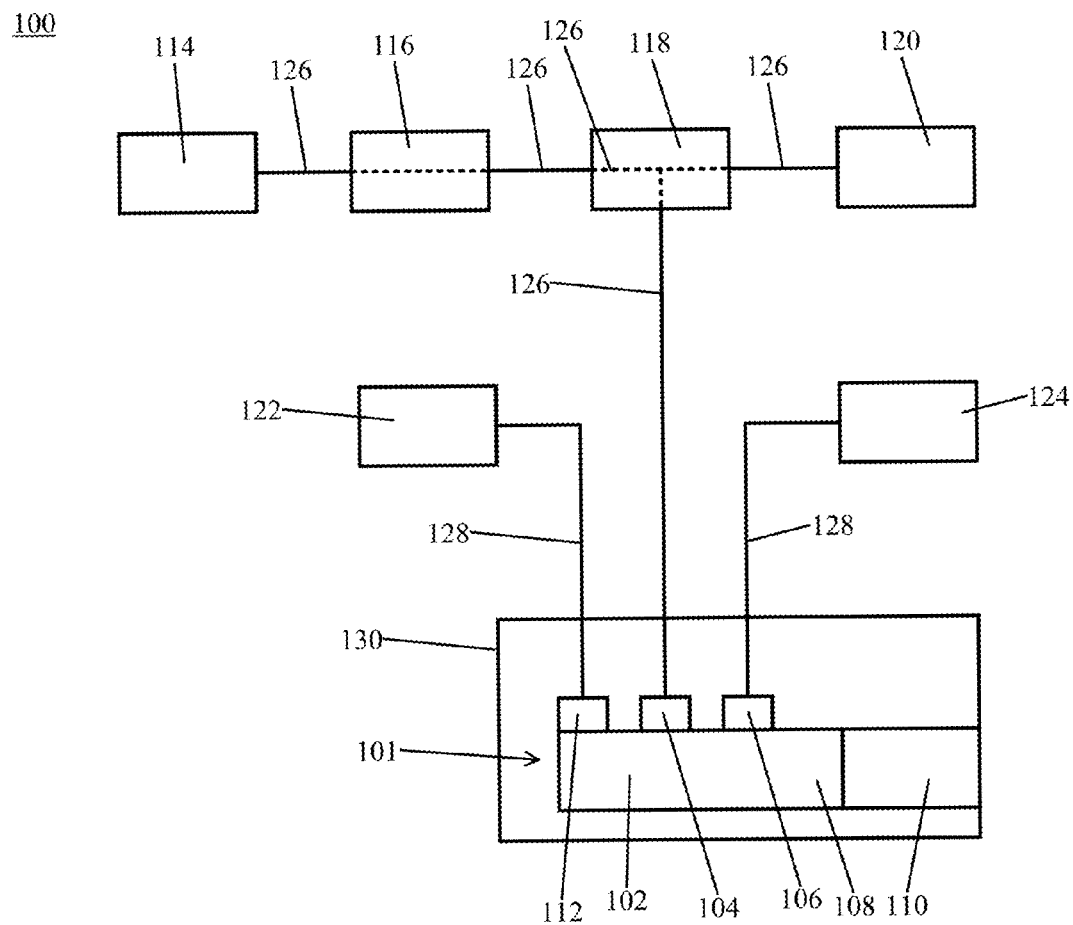
FIG. 25 shows a radiometer system.

According to an embodiment as shown in FIG. 25, radiometer system 100 includes radiation absorber 104, thermal member 103, and thermal regulator 112 disposed on substrate 102. Thermal link 108 thermally connects radiometer 101 to thermal reference 110. Light source 114 emits optical radiation that propagates along light path 126. Optionally, the optical radiation can be transmitted through attenuator 116 (to attenuate an intensity of the optical radiation) or switch 118 (e.g., a mirror or electro optic switch) and directed into a detector 120, e.g., a power meter. Radiometer 101 can be disposed in container 130. Container 130 can be environmentally controlled for a composition of gas included therein (e.g., a pressure of air, nitrogen, noble gas, and the like). Optical radiation can be directed onto radiation absorber 104, and power source 122 can be electrically connected via electrical connection (e.g., a wire) to thermal regulator 112 to provide electrical power thereto. Resistance bridge (e.g., an internally or externally referenced phase-sensitive detector, current measuring device, and the like) is connected thermal member 106 to measure a resistance of thermal member 106. Container 130 can be, e.g., evacuated with a vacuum pump, operated at under vacuum or elevated pressure condition, operated at a cryogenic temperature (or higher temperature), and the like. Thermal reference 110 can be, e.g., a heat sink and can be maintained at a constant temperature or a varying temperature (e.g., a temperature ramp, whereby the temperature changes over a period of time). The temperature of thermal reference 110 can be monitored and controlled, e.g., a feedback sensor, and can include provisions for heating and cooling thermal reference 110. In an embodiment, thermal reference 110 is maintained at a constant, known temperature with respect to a temperature of radiometer 101.

Radiometer 101 can be illuminated by radiation from an optical fiber (e.g., a telecommunications optical fiber) that is, e.g., aligned to a central portion of radiation absorber 104 at an angle such as normal incidence. In an embodiment, radiation absorber 104 is illuminated by optical radiation propagating in free-space.

Electrical connections between electrical connection 128 and thermal regulator 112 or thermal member can be made with a wirebond, e.g., an Al wirebond.

In an embodiment, thermal member 106 is operated at a temperature greater than a Tc of its constituent metal layer (referred to as "thermistor mode"). Here, thermal member 6 includes an absorber layer (e.g., including VACNTs) disposed on a metal layer that includes Mo with metal electrode leads (e.g., Mo), and thermal regulator 112 includes a metal layer including, e.g., Mo, without an absorber layer disposed thereon. According to an alternative embodiment, thermal member 106 is operated at a temperature less than a Tc of its constituent metal layer (referred to as "transition edge mode"). Here, thermal member 6 can include a metal layer (e.g., Mo) without an absorber layer disposed thereon, and thermal regulator 112 can include an absorber layer (e.g., including VACNTs) disposed on a metal layer that includes Mo with metal electrode leads (e.g., Mo).

Figure 26:
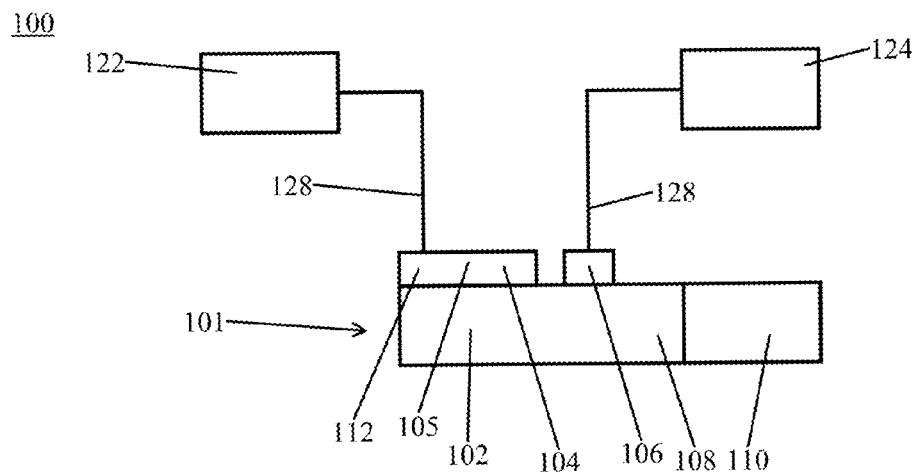
FIG. 26 shows a radiometer system.

As shown in FIG. 26, radiometer system 100 can include thermal regulator 112 and radiation absorber 104 disposed on substrate 102 as single member 105 such that power source 122 is electrically connected to thermal regulator 112 of single member 105.

Figure 27:
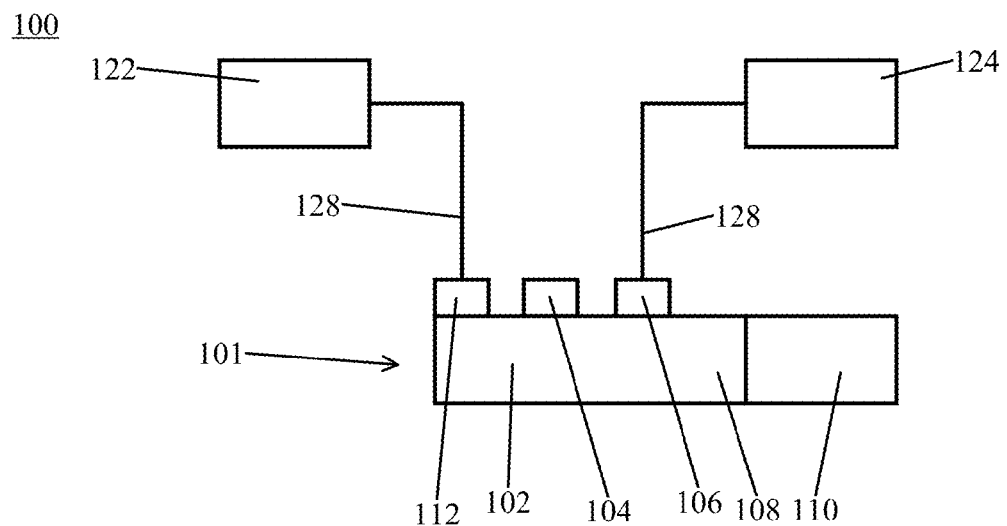
FIG. 27 shows a radiometer system.

In an embodiment, shown in FIG. 27, radiometer system 100 is arranged to operate in thermistor mode whereby thermal regulator 112 includes a metal layer without an absorber layer, and thermal member 106 includes a metal layer and absorber layer. Thermal regulator 112 is connected to power source 122, and thermal member 106 is connected to resistance bridge 124. Here, the temperature of thermal member 106 can be above a Tc of its metal layer.

Figure 28:
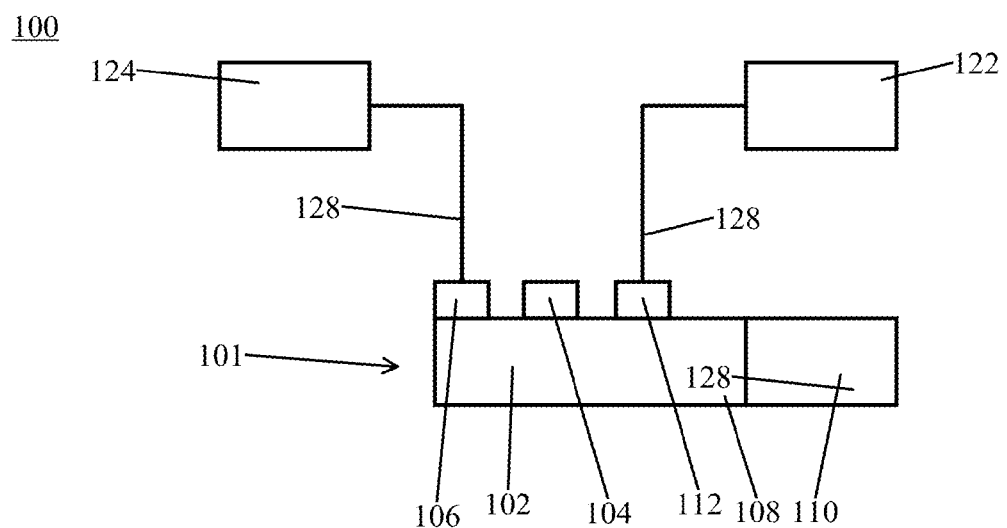
FIG. 28 shows a radiometer system.

According to an embodiment, shown in FIG. 28, radiometer system 100 is arranged to operate in transition edge mode whereby thermal member 106 includes a metal layer without an absorber layer, and thermal regulator 112 includes a metal layer and absorber layer. Thermal regulator 112 is connected to power source 122, and thermal member 106 is connected to resistance bridge 124. Here, the temperature of thermal member 106 is less than a Tc of its metal layer.

Using the radiometer, optical power of optical radiation absorbed by the radiation absorber can be determined. In brief, absorbed optical radiation indirectly heats the thermal member, changing its temperature and therefore its resistance. Upon blocking the optical radiation from the radiation absorber, the thermal regulator is used heat the radiometer to obtain a same resistance change. The optical power is obtained from knowledge of the power applied to the thermal regulator needed to obtain the resistance value. In this manner, the optical power determination can be S.I. traceable.

According to an embodiment, a process for acquiring optical power includes providing the radiometer, absorbing optical radiation by the radiation absorber during an absorption time, and determining the optical power of the optical radiation, based on absorption of the optical radiation by the radiation absorber. The radiation absorber, the thermal member, the thermal regulator, or a combination comprising at least one of the foregoing comprises a plurality of carbon nanotubes, wherein the carbon nanotubes are mutually aligned with respect to the substrate.

In a closed loop operation, the process for acquiring optical power further includes maintaining a temperature of the radiometer at substantially a constant temperature by applying (in an absence of the absorption time) electrical power at a first power level to the thermal regulator and decreasing (during the absorption time) the electrical power applied to the thermal regulator from the first power level to a second power level. A difference in the first power level and the second power level is determined to acquire the optical power of the optical radiation.

In an open loop operation, the process for acquiring optical power further includes maintaining (during a quiescent time) a temperature of the radiometer substantially at a zeroth temperature and a resistance of the thermal member substantially at a zeroth resistance corresponding to the zeroth temperature, applying (during the quiescent time and the absorption time) electrical power at a zeroth power level to the thermal regulator, obtaining (during the absorption time) the temperature of the radiometer at a first temperature and a resistance of the thermal member at a first resistance corresponding to the first temperature, and increasing (during a heating time) the electrical power from the zeroth power level to a first power level to obtain the temperature of the radiometer at the first temperature and the resistance of the thermal member at the first resistance. Also, the process includes determining a difference in the zeroth power level and the first power level, a difference in the zeroth resistance and the first resistance, or a combination comprising at least one of the foregoing to acquire the optical power of the optical radiation.

Figure 29:
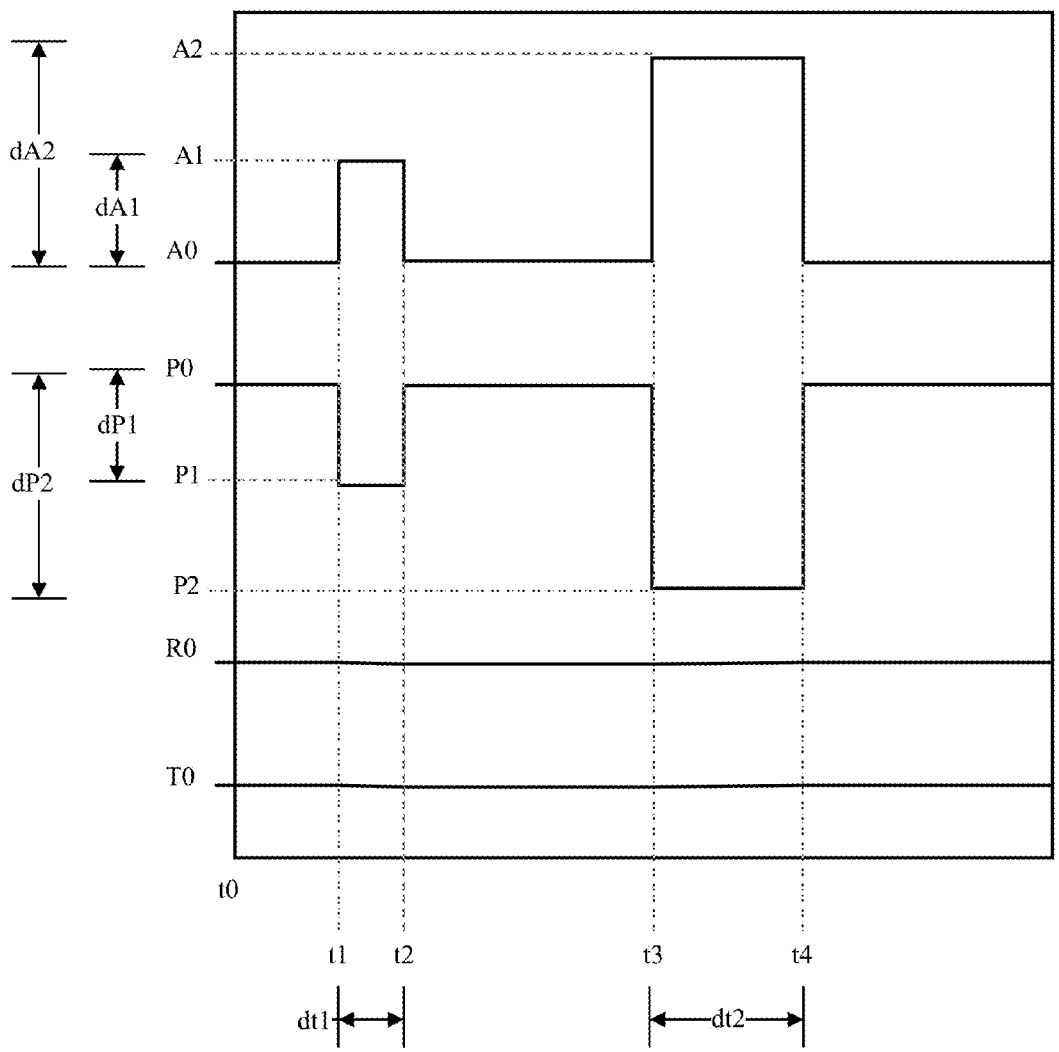
FIG. 29 shows timing profiles for optical absorbance, thermal regulation, and response of radiometer temperature and resistance of a thermal member.

FIG. 29 shows a timing profile for operating the radiometer in a closed loop process. At an initial time t0, an amount of optical absorption is at a zeroth absorption amount A0; power applied to the thermal regulator is zeroth optical power level P0; a temperature of the radiometer is T0, and the thermal member has a resistance value of the zeroth resistance R0. During absorption time dt1, the radiation absorber absorbs optical radiation at first optical power level A1. The temperature of the radiometer and resistance of the thermal member are respectively maintained substantially at T0 and R0 by applying electrical power at a zeroth power level P0 in the absence of the absorption time dt1, but decreasing (during absorption time dt1) the electrical power applied to the thermal regulator to first power level P1. The optical power of incident light may change, e.g., increase in intensity at time t3 to t4, such that optical power A2 is absorbed by the radiation absorber during absorption time dt2. The temperature of the radiometer and resistance of the thermal member are respectively maintained substantially at T0 and R0 by applying electrical power at zeroth power level P0 in the absence of absorption time dt2, but decreasing (during absorption time dt2) the electrical power applied to the thermal regulator to second power level P2. In this manner, absorption of optical powers (A1, A2) during absorption times (dt1, dt2) can be determined from the electrical power (P1, P2) applied to the thermal regulator relative to the zeroth power P0.

Figure 30:
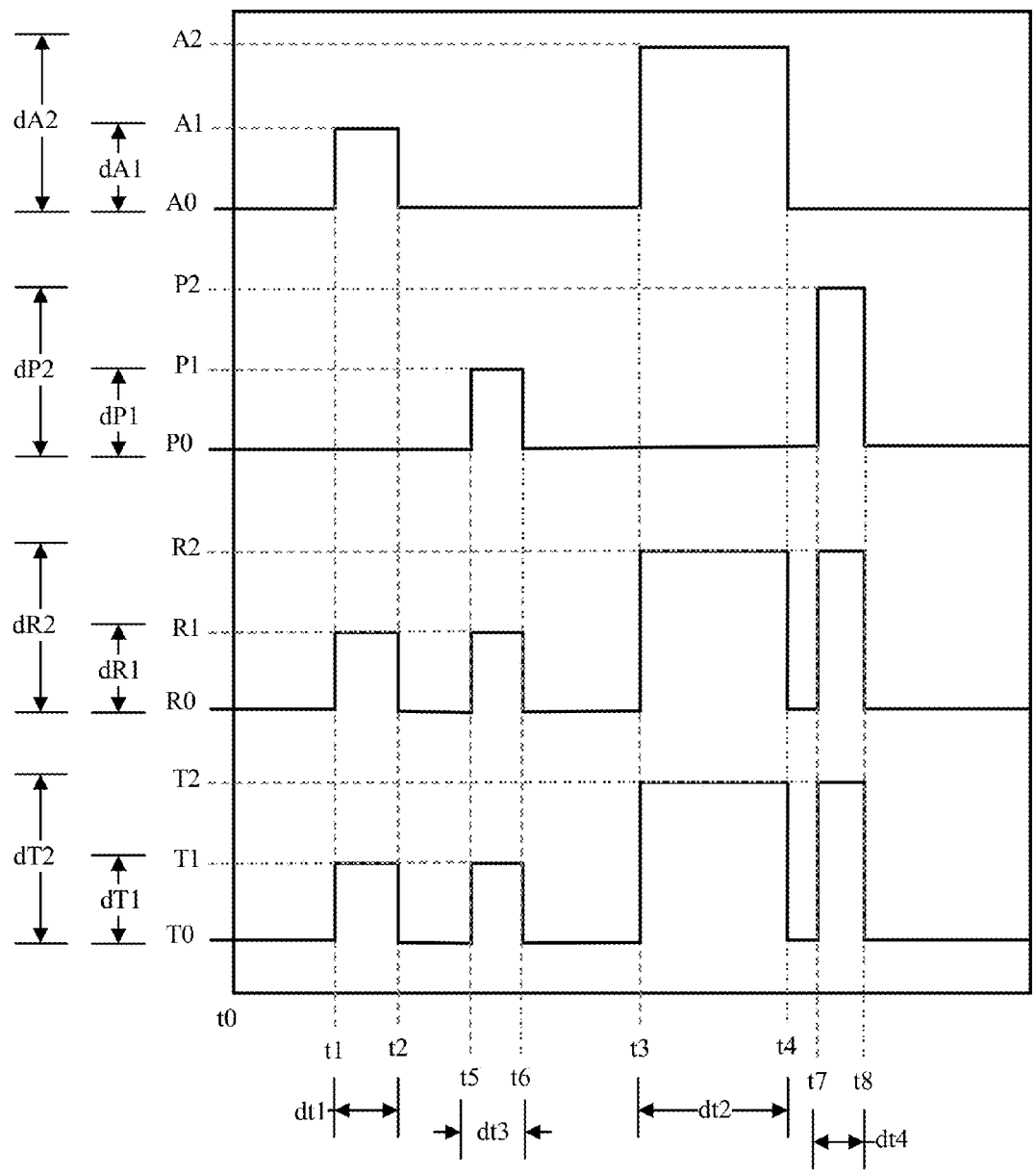
FIG. 30 shows timing profiles for optical absorbance, thermal regulation, and response of radiometer temperature and resistance of a thermal member.

FIG. 30 shows a timing profile for operating the radiometer in an open loop process. At an initial time t0, an amount of optical absorption is at zeroth absorption amount A0; power applied to the thermal regulator is zeroth optical power level P0; a temperature of the radiometer is T0, and the thermal member has a resistance value of zeroth resistance R0. During absorption time dt1, the radiation absorber absorbs optical radiation at first optical power level A1. The temperature of the radiometer and resistance of the thermal member respectively increase to first temperature T1 and first resistance R1 while keeping the thermal regulator at zeroth power level P0. Thereafter, during heating time dt3, the power applied to the thermal regulator is increased to first power level P1 to heat the radiometer again to first temperature T1 to obtain first resistance R1 of the thermal member. At a subsequent absorption time dt2, the radiation absorber absorbs optical radiation at second optical power level A2. The temperature of the radiometer and resistance of the thermal member respectively increase to second temperature T2 and second resistance R2 while keeping the thermal regulator at zeroth power level P0. Thereafter, during heating time dt4, the power applied to the thermal regulator is increased to second power level P2 to heat the radiometer again to second temperature T2 to obtain second resistance R2 of the thermal member. In this manner, absorption of optical powers (A1, A2) during absorption times (dt1, dt2) can be determined from the electrical power (P1, P2) applied to the thermal regulator relative to the zeroth power P0 during heating times (dt3, dt4).

The apparatus and process herein are further illustrated by the following examples, which are non-limiting.

EXAMPLES

Example 1

First Radiometer

Figure 31A:
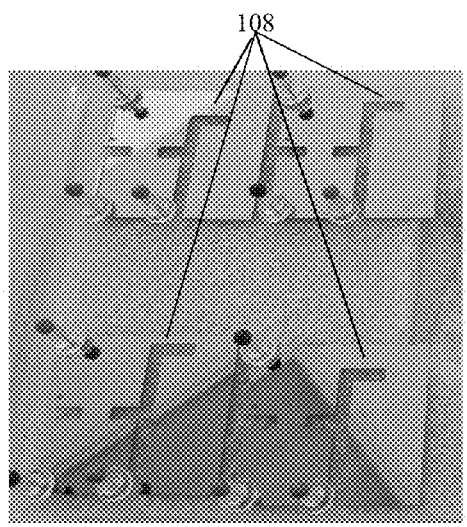
FIGS. 31A, 31B, and 31C respectively show a photograph of a substrate, radiometer, and radiometer with electrical connections.
Figure 31B:
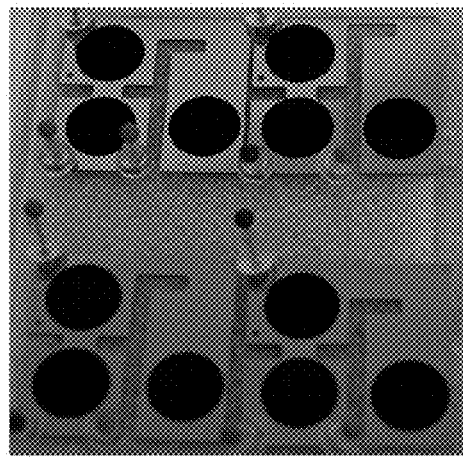
Figure 31C:
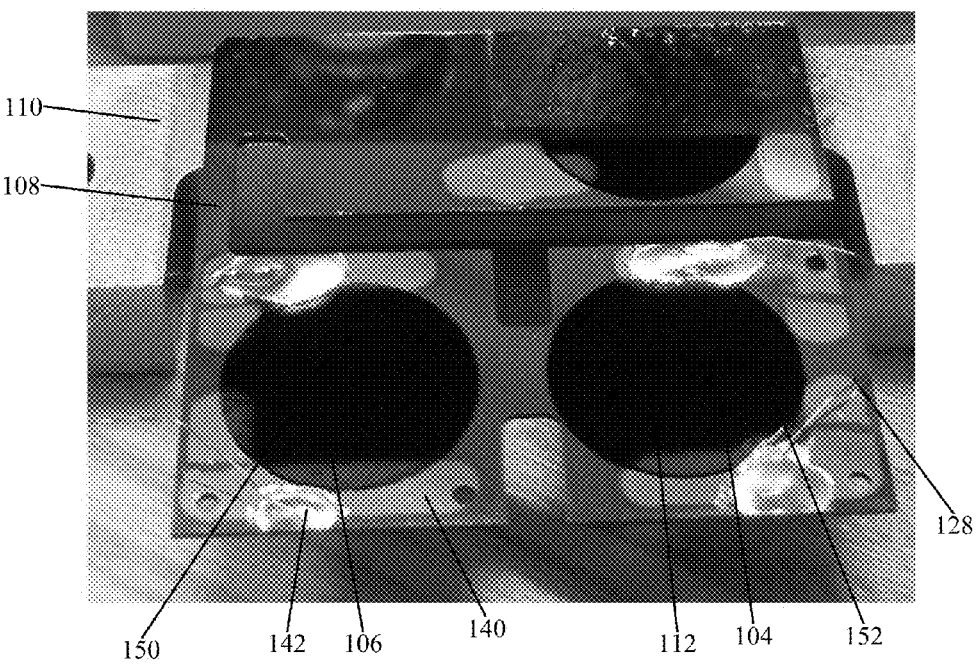

A radiometer was made as described in Tomlin et al., Optics Letters 38, 175 (2013), the disclosure of which is incorporated by reference herein in its entirety. With reference to FIGS. 31A, 31B, and 31C, radiometer 101 was fabricated from a double-side polished silicon wafer, which was lithographically patterned and micromachined using a Bosch process plasma etch to define the geometry (FIG. 31A). The silicon leg that sets thermal link 108 had dimensions of 6.7 mm long, 2.6 mm wide, and 375 nm thick. VACNTs were grown by first depositing 500 nm of $SiO_2$ and 20 nm Al followed by oxidizing the Al to $Al_2O_3$ and depositing 2 nm Fe, and then chemical vapor deposition nanotube growth at 750° C. for 2.5 min. The VACNTs were 150 μm long and grown in 9 mm circles from use of a shadow mask during Fe deposition as shown in FIG. 31B. A second shadow mask was used to deposit 34 nm of Au at opposite sides of each VACNT region. Electrical contact was made to each VACNT region via Au electrodes 140 on which was disposed silver-based conductive epoxy 142 to which 15 mm long Cu-clad NbTi wires 128 were attached. The base of radiometer 101 was clamped to a Cu thermal reference 110 that was bolted to a stage (held at 4 K) of a pulse tube cooler in a dilution refrigerator as in FIG. 31C. First VACNT 150 closest to thermal link 108 was used as a thermistor. A resistance of the thermistor was measured with a commercial lock-in amplifier, using a small AC excitation current in order to minimize self-heating.

Second VACNT 152 performed a dual role of thermal regulator and radiation absorber. Input electrical power to the second VACNT 152 was determined using a commercial current source to set a stiff current bias while the voltage was monitored. Input optical power was coupled to second VACNT using a 9 μm core, single-mode telecommunication optical fiber aligned at normal incidence to the center of second VACNT 152. The fiber tip had a 1550 nm antireflection coating that reduced reflection from the tip to less than 0.3%. A distance between the fiber tip and second VACNT 152 was 9.1 mm, which gave a spot size diameter ($1/e^2$) of 1.7 mm. Known optical powers (±0.5% due to unknown coupling and splice losses) were applied with a 1550 nm continuous wave fiber laser attenuated by two programmable fiber attenuators, which were calibrated using an optical switch and a National Institute of Standards and Technology (NIST)-calibrated power meter. Total hemispherical reflectance measurements of the VACNTs provided total reflectance less than 0.07% for visible wavelengths and less than 0.35% for 5 μm to 10 μm wavelengths.

Example 2

Second Radiometer

Figure 32:
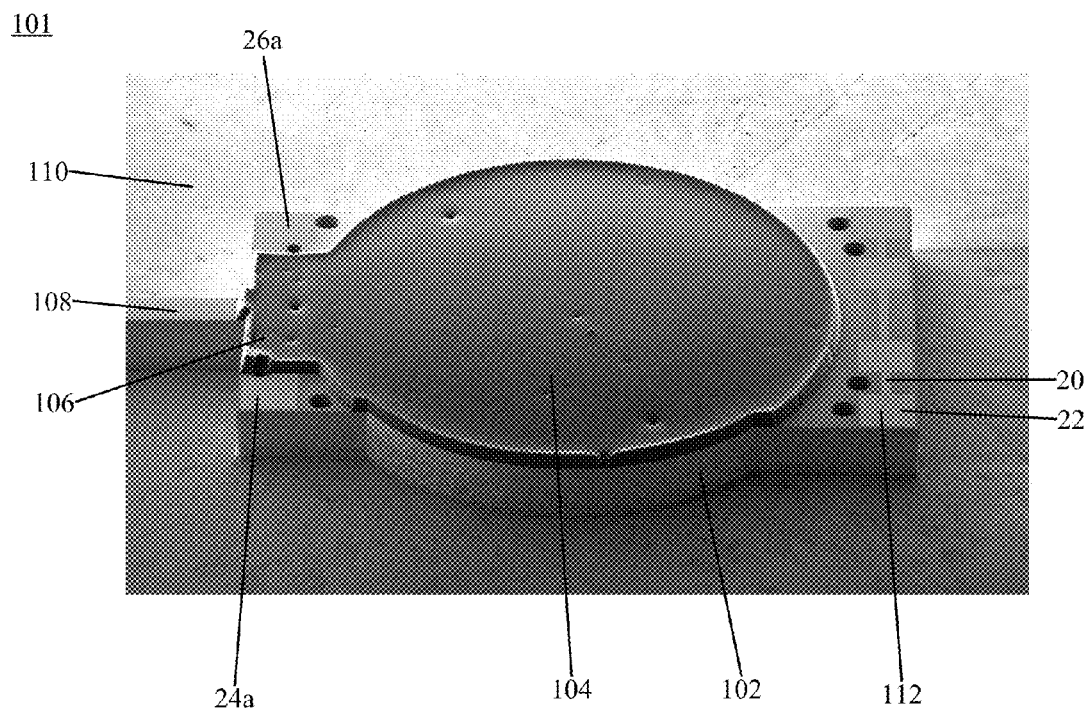
FIG. 32 shows a micrograph of a radiometer.

A second radiometer was made using a shadowmask wafer and lithographic fabrication on a 76.2 mm diameter silicon wafer. A molybdenum thin film was disposed on the silicon wafer and subjected to wet etching followed by formation of $Al_2O_3$ and Fe with micro-machined silicon etch, and VACNT growth. A scanning electron microscope (SEM) micrograph of the resulting radiometer from the shadowmask wafer is shown in FIG. 32.

Example 3

Third Radiometer

Figure 33A:
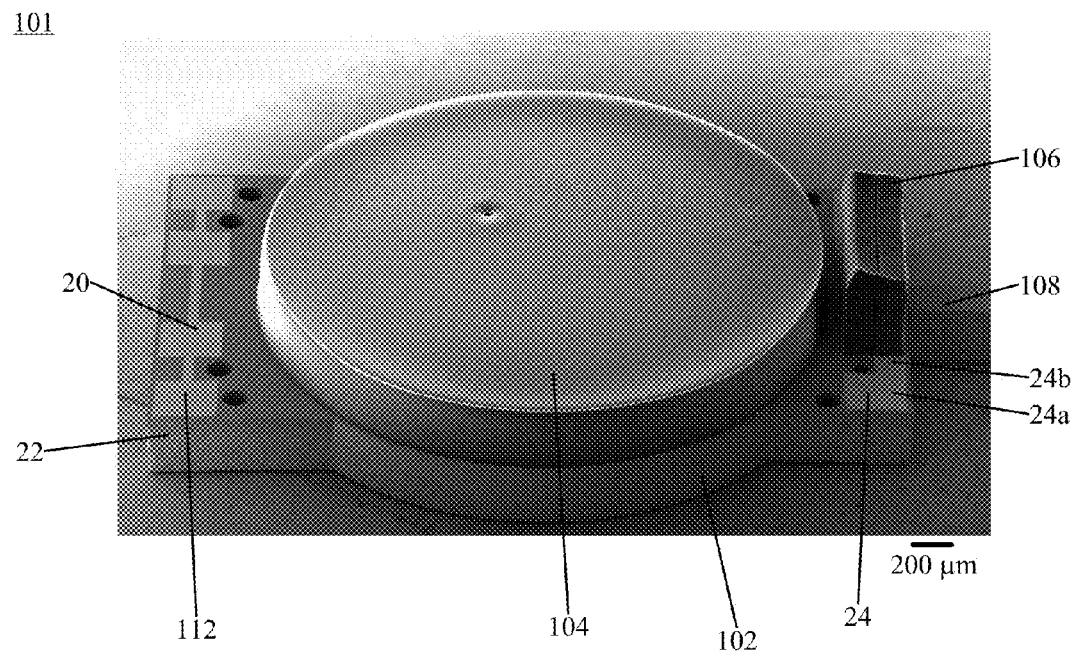
FIGS. 33A, 33B, 33C, and 33D show micrographs of a radiometer.
Figure 33B:
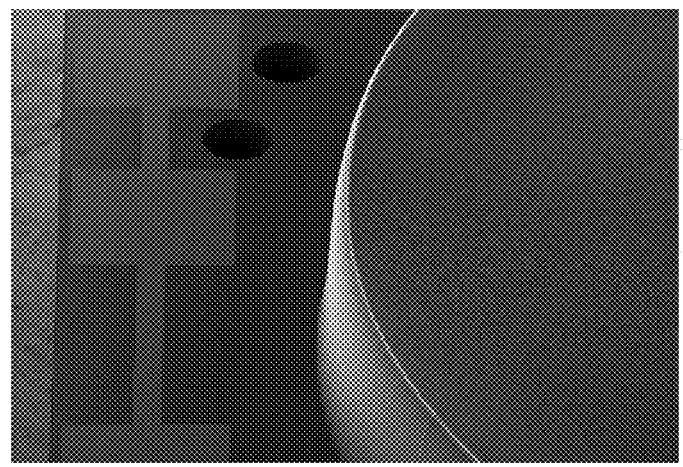
Figure 33C:
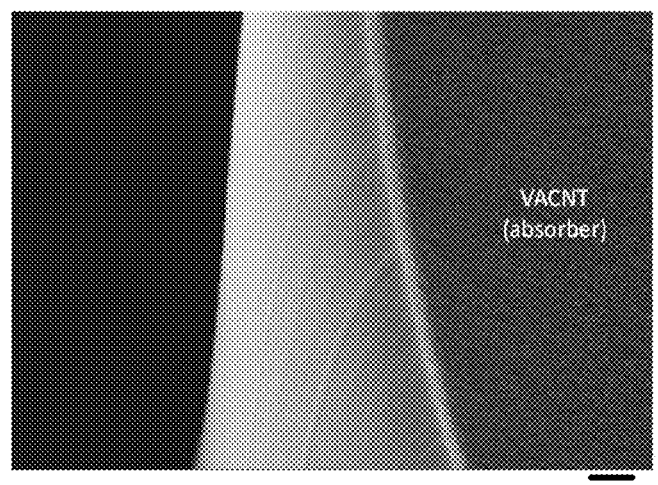
Figure 33D:
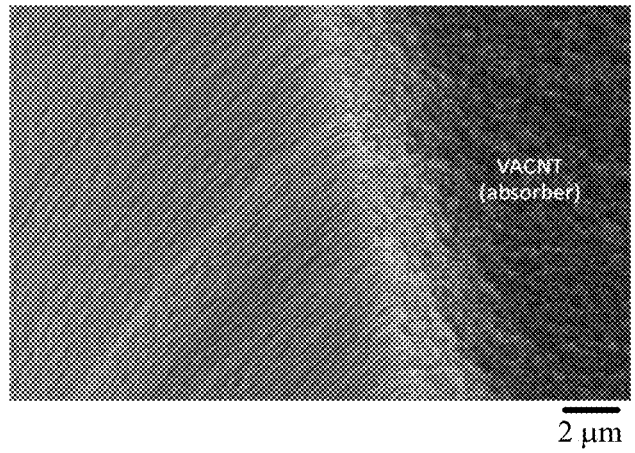

A third radiometer was made by lithographically fabrication on a 76.2 mm diameter silicon wafer. A molybdenum thin film was disposed on the silicon wafer and subjected to wet etching followed $Al_2O_3$ and Fe liftoff with micro-machined silicon etch, and VACNT growth. An SEM micrograph of the resulting radiometer from the liftoff wafer is shown in FIG. 33A. SEM micrographs of the VACNTs at various magnification are shown in FIGS. 33B, 33C, and 33D.

Example 4

Reflectance of Radiation Absorber

Figure 34A:
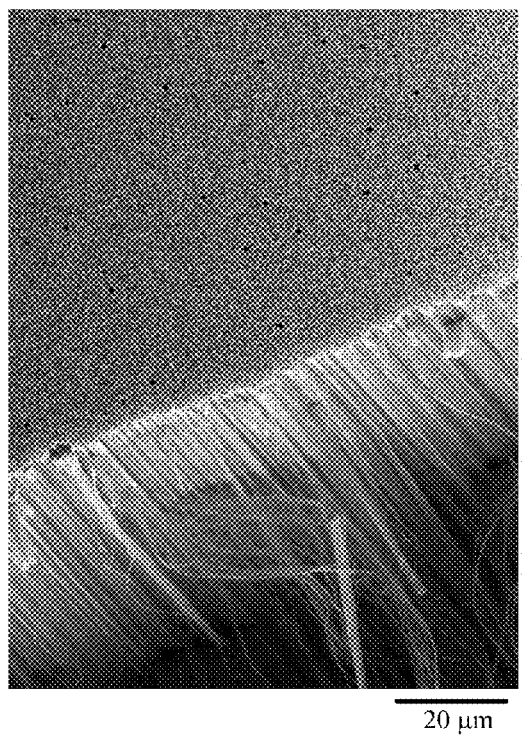
FIGS. 34A, 34B, 34C, and 34D show micrographs of a plurality of carbon nanotubes.
Figure 34B:
Figure 34C:
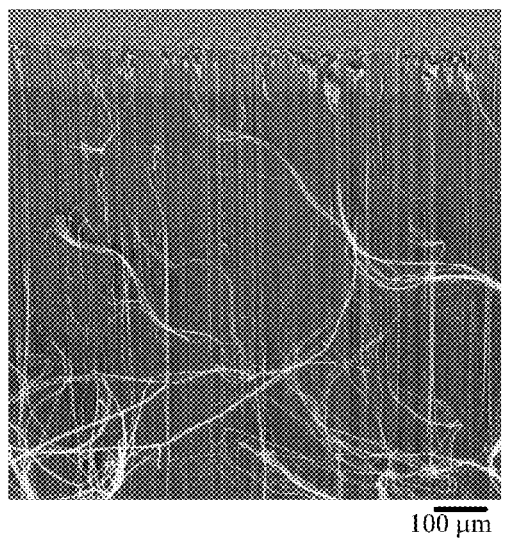
Figure 34D:
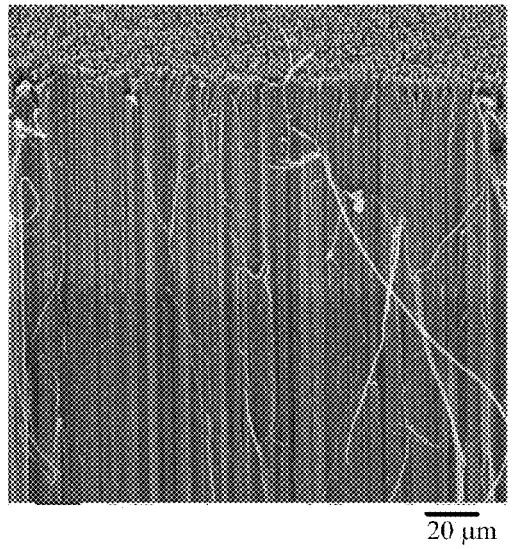

Multiwall VACNTs were grown on 100 mm silicon wafers. The fabrication followed that disclosed in Tomlin et al., Carbon 74, 329 (2014), the disclosure of which is incorporated by reference in its entirety. The process included growth of 500 nm $SiO_2$, deposition of 10 nm $Al_2O_3$ and 1 nm Fe catalyst layers and growth of VACNTs using water-assisted chemical vapor deposition. Each wafer was introduced into a 15 cm quartz tube furnace and ramped to a temperature of 780° C. while flowing Ar gas at 3250 sccm and $H_2$ at 580 sccm through the tube. Nanotube growth was carried out at atmospheric pressure by adding $C_2H_4$ gas at 300 sccm to the flow. The resulting VACNTs were 2 mm tall and appeared black. Each wafer was divided into 4 pie-shaped samples using a diamond scribe. One sample from each wafer was left unexposed to serve as the control and the other samples were exposed to an oxygen plasma using a commercial plasma system. The settings used for the oxygen plasma treatment were a flow rate of 50 sccm $O_2$, pressure of 32 Pa (0.24 T), RF power from 50 W to 200 W at 30 kHz for a duration from 15 seconds (s) to 300 s. SEM micrographs of VACNTs before oxygen plasma treatment are shown in FIGS. 34A and 34B. Helium ion microscope (HIM) images of VACNTs after exposure to 15 seconds of oxygen plasma to remove top crust and cause clumping of nanotube tips are shown in FIGS. 34C and 34D.

Total hemispherical reflectance of the samples was acquired using a commercial spectrophotometer with a 150 mm diameter integrating sphere accessory. Samples were held at a back of the sphere against an 18 mm diameter port, tilted at 8° from normal incidence. The incident light spot size on the samples was 7.5 mm by 15 mm, the slit width was 5 mm, each data point was integrated for 1 s, and three separate scans were averaged together. Background scans were used to account for any stray light in the sphere and a calibrated standard black reference material was used to convert the raw detector data to absolute reflectance. The total hemispherical reflectance is shown in FIG. 35. Plasma-treated samples had lower total reflectance over the whole measured wavelength range, with up to 8 times lower reflectance at short wavelengths.

While carbon nanotube growth was initially randomly oriented, crowding introduced vertical alignment. Additionally, plasma-induced agglomeration of nanotube ends formed voids among the VACNTs, which altered a morphology of the VACNT surface. The voids may have behaved as light traps to reduce reflectance.

Example 5

Resistance Values

Figure 36:
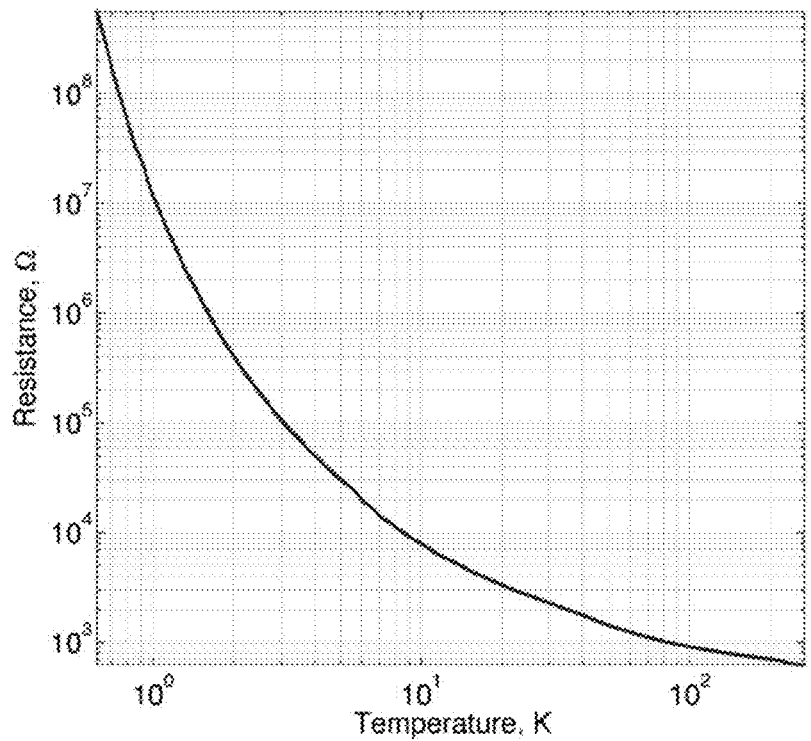
FIG. 36 shows a graph of resistance versus temperature for a plurality of carbon nanotubes.
Figure 37:
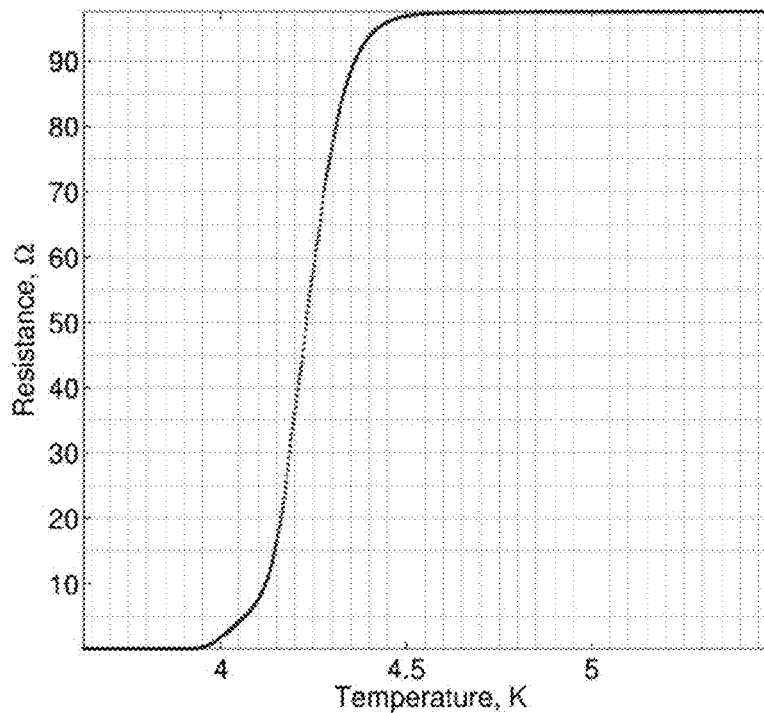
FIG. 37 shows a graph of resistance versus temperature for a metal layer.

A resistance as a function of temperature was acquired for VACNTs formed according to Example 2. Results are shown in FIG. 36. Similarly, resistance as a function of temperature was acquired for a Mo metal layer formed on the substrate. Results are shown in FIG. 37. A transition from superconductivity to metal conduction is apparent in FIG. 37.

Example 6

Sensitivity of Radiometer

Additional radiometers are produced using the procedure of Example 2 wherein a different composition (RhFe, RuO2, a commercially available metal oxy-nitride ally (available under the trade name CERNOX), Ge, VACNTs, Mo) is used for the thermal member. Unitless sensitivities of the thermal member obtained at 4 K from each different compositions is measured and shown in the graph of FIG. 38.

Example 7

Response of Radiometer

The radiometer of Example 2 was subjected to optical absorption, and the the relative response of the radiometer to 450 µW input optical power was determined. The results are shown in FIG. 39. The time constant was determined to be 631 µs.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A radiometer comprising:
   a substrate;
   a radiation absorber disposed on the substrate to absorb radiation;
   a thermal member disposed on the substrate to change electrical resistance in response to a change in temperature of the radiometer; and
   a thermal link to connect the radiometer to a thermal reference,
   wherein the radiation absorber, the thermal member, or a combination comprising at least one of the foregoing comprises a plurality of carbon nanotubes, the carbon nanotubes being mutually aligned with respect to the substrate, and the radiometer being configured to detect optical power.

2. The radiometer of claim 1, further comprising a thermal regulator disposed on the substrate,
   wherein the thermal regulator comprises a metal, a plurality of carbon nanotubes that are mutually aligned with respect to the substrate, or a combination comprising at least one of the foregoing.

3. The radiometer of claim 2, wherein the radiation absorber, the thermal member, and the thermal regulator are separately disposed on the substrate.

4. The radiometer of claim 2, wherein the radiation absorber and the thermal regulator are integrally disposed on the substrate as a single member, and the single member and the thermal member are separately disposed on the substrate.

5. The radiometer of claim 1, wherein the thermal member comprises the plurality of carbon nanotubes, and
the radiation absorber comprises a material having a selected optical absorption from 200 nm to 500 μm.

6. The radiometer of claim 2, wherein the radiation absorber comprises the plurality of carbon nanotubes, and the thermal member comprises a metal.

7. The radiometer of claim 6, wherein the thermal member further comprises a plurality of carbon nanotubes.

8. The radiometer of claim 2, wherein the carbon nanotubes are vertically aligned with respect to the substrate.

9. The radiometer of claim 1, wherein the radiation absorber has a reflectance less than or equal to $1 \times 10^{-3}$, based on a total hemispherical reflectance, at a wavelength from 350 nm to 2400 nm.

10. The radiometer of claim 1, wherein the radiation absorber has an optical absorptance greater than or equal to 0.999 for radiation comprising a wavelength from 200 nm to 500 μm.

11. The radiometer of claim 1, wherein a time constant of the radiometer is less than 1 millisecond (ms).

12. The radiometer of claim 2, wherein the change in temperature of the thermal member occurs in response to absorption of radiation by the absorber, to heating by the thermal regulator, or a combination comprising at least one of the foregoing.

13. The radiometer of claim 1, wherein the radiometer is configured to detect the change in temperature at a temperature of the radiometer that is less than or equal to 80 Kelvin.

14. The radiometer of claim 1, wherein the radiometer is configured to detect absorption of radiation for a radiation power less than or equal to 500 watts per square centimeter ($W/cm^2$).

15. The radiometer of claim 1, wherein the thermal member has a unitless sensitivity having a magnitude that is greater than or equal to 1.5 at a temperature of 4 K.

16. A radiometer comprising:
a substrate;
a radiation absorber disposed on the substrate to absorb radiation and comprising a first plurality of carbon nanotubes;
a thermal member disposed on the substrate to change electrical resistance in response to a change in temperature of the radiometer;
a thermal regulator disposed on the substrate to heat the radiometer and comprising a metal and a second plurality of carbon nanotubes; and
a thermal link to connect the radiometer to a thermal reference,
wherein the first plurality of carbon nanotubes and the second plurality of carbon nanotubes are mutually aligned with respect to the substrate, and the radiometer is configured to detect optical power.

17. The radiometer of claim 16, wherein the radiation absorber and the thermal regulator are integrally disposed on the substrate as a single member.

18. A process for acquiring optical power, the process comprising:
providing a radiometer comprising:
a substrate;
a radiation absorber disposed on the substrate to absorb radiation;
a thermal member disposed on the substrate to change electrical resistance in response to a change in temperature of the radiometer;
a thermal regulator disposed on the substrate to heat the radiometer; and
a thermal link to connect the radiometer to a thermal reference;
absorbing optical radiation by the radiation absorber during an absorption time; and
determining the optical power of the optical radiation, based on absorption of the optical radiation by the radiation absorber,
wherein the radiation absorber, the thermal member, the thermal regulator, or a combination comprising at least one of the foregoing comprises a plurality of carbon nanotubes, the carbon nanotubes being mutually aligned with respect to the substrate, and the radiometer being configured to detect optical power.

19. The process of claim 18, further comprising:
maintaining a temperature of the radiometer at substantially a constant temperature by:
applying, in an absence of the absorption time, electrical power at a first power level to the thermal regulator; and
decreasing, during the absorption time, the electrical power applied to the thermal regulator from the first power level to a second power level; and
determining a difference in the first power level and the second power level to acquire the optical power of the optical radiation.

20. The process of claim 18, further comprising:
maintaining, during a quiescent time:
a temperature of the radiometer substantially at a zeroth temperature and
a resistance of the thermal member substantially at a zeroth resistance corresponding to the zeroth temperature;
applying, during the quiescent time and the absorption time, electrical power at a zeroth power level to the thermal regulator;
obtaining, during the absorption time:
the temperature of the radiometer at a first temperature and
a resistance of the thermal member at a first resistance corresponding to the first temperature;
increasing, during a heating time, the electrical power from the zeroth power level to a first power level to obtain:
the temperature of the radiometer at the first temperature and
the resistance of the thermal member at the first resistance; and
determining a difference in the zeroth power level and the first power level, a difference in the zeroth resistance and the first resistance, or a combination comprising at least one of the foregoing to acquire the optical power of the optical radiation.

* * * * *